(12) United States Patent
Paul

(10) Patent No.: US 9,255,184 B2
(45) Date of Patent: Feb. 9, 2016

(54) PROCESS FOR MAKING STABLE HIGH VISCOSITY AMINO SILICONE EMULSION

(75) Inventor: Amit Kumar Paul, Kolkata (IN)

(73) Assignee: WACKER METROARK CHEMICALS PVT. LTD., West Bengal (IN)

( * ) Notice: Subject to any disclaimer, the term of this patent is extended or adjusted under 35 U.S.C. 154(b) by 201 days.

(21) Appl. No.: 13/259,228

(22) PCT Filed: Mar. 10, 2010

(86) PCT No.: PCT/EP2010/053029
§ 371 (c)(1),
(2), (4) Date: Sep. 23, 2011

(87) PCT Pub. No.: WO2010/108781
PCT Pub. Date: Sep. 30, 2010

(65) Prior Publication Data
US 2012/0020908 A1    Jan. 26, 2012

(30) Foreign Application Priority Data
Mar. 23, 2009 (IN) .............................. 511/KOL/2009

(51) Int. Cl.
| | |
|---|---|
| *C08G 77/26* | (2006.01) |
| *B01F 17/00* | (2006.01) |
| *B01F 17/54* | (2006.01) |
| *C08J 3/05* | (2006.01) |

(52) U.S. Cl.
CPC .............. *C08G 77/26* (2013.01); *B01F 17/005* (2013.01); *B01F 17/0071* (2013.01); *C08J 3/05* (2013.01); *C08J 2383/08* (2013.01)

(58) Field of Classification Search
CPC  B01F 17/005; B01F 17/0071; C08J 2383/08; C08J 3/05; C08G 77/26
USPC ....................................................... 424/70.12
See application file for complete search history.

(56) References Cited

U.S. PATENT DOCUMENTS

| | | | |
|---|---|---|---|
| 6,093,841 A * | 7/2000 | Winkhofer et al. ........... | 556/425 |
| 6,515,095 B1 | 2/2003 | Omura et al. | |
| 2005/0215806 A1* | 9/2005 | Heller et al. .................. | 556/413 |

FOREIGN PATENT DOCUMENTS

| | | |
|---|---|---|
| EP | 0927735 A1 | 7/1999 |
| EP | 1136513 A2 | 9/2001 |

\* cited by examiner

*Primary Examiner* — Michael G Hartley
*Assistant Examiner* — Robert Cabral
(74) *Attorney, Agent, or Firm* — The PL Law Group, PLLC

(57) ABSTRACT

A stable highly viscous aminosilicone polymeric fluids and a process for synthesis of stable high viscosity amino silicone emulsion by using the said aminosilicone polymeric fluid by way of a simple and cost-effective manufacturing process yielding emulsions in large scale commercial process with a particle size from 0.01 micron to 150 micron for diverse applications such as in personal care, specially hair care, textile, release and alike.

23 Claims, No Drawings

PROCESS FOR MAKING STABLE HIGH VISCOSITY AMINO SILICONE EMULSION

CROSS REFERENCE TO RELATED APPLICATION

The present application claims all benefits accruing under 35 U.S.C. §365(c) from the PCT International Application PCT/EP2010/053029, with an International Filing Date of Mar. 10, 2010, which claims the benefit of Indian patent application No. 511/KOL/2009 filed in the Indian Patent Office on Mar. 23, 2009, which claims the priority the entire contents of which are incorporated herein by reference.

The present invention relates to a stable highly viscous aminosilicone polymeric fluid and in particular, relates to a process for the synthesis of stable high viscosity amino silicone emulsion involving the said aminosilicone polymeric fluid by way of a simple and cost-effective manufacturing process that would not require the involvement of complex machine and thus can be readily used for making emulsion in large scale commercial process with a particle sizes from 0.01 micron to 150 micron for diverse applications such as in personal care, specially hair care, textile, release and alike.

Importantly, the process is directed to be easily adapted for high viscous amino silicone emulsion production for diverse beneficial end use in personal care, specially in hair care; textiles; home care, release and alike applications. More importantly, the silicone emulsion produced by way of the process of the present invention is in the range from 0.01 micron to 150 micron (D50 value) with a very narrow particle size distribution which is highly stable and found to have consolidated advantageous and beneficial use in personal care, textile softener, different release applications, in fabric care, paper coating and other application and is not limited to the said applications.

It is well known to provide amino silicone emulsions with varying particle sizes to suit different end applications and uses.

Amino silicone and an emulsion of amino silicone has been in use for different end use applications with certain benefits especially in textiles for softener, in conditioners for hair care, in PU release. It is also well known to use amino silicone emulsion in such application with a limited to specific application in textiles, personal care, release, and not limited to said applications.

Today globally silicone in personal care, especially in hair care formulations has become essential as a performance ingredient in the said products by the way of its presence in small amount within the formulations. In accordance with the market demand and competition, cosmetic manufacturers are using different kinds of silicone products with different functionalities in such formulations to optimize the product effects. As a result of such large variety of formulation, product complexity also increases with use of multi silicone components in the formulation. In the categories of different silicone emulsions, most popular category of silicone emulsions, like dimethicone or dimethiconol or vinyldimethicone or vinyldimethiconol or mixture of these components are used in different hair care applications. Most important part of these silicone emulsions is the availability in different variants as per formulation requirements with variation of particle sizes from 0.02 micron to 50 micron, with different oil viscosities from few hundred to few million cps and wherein such emulsions can be made by simple stirring or homogenizing either by mechanical process or emulsion polymerization process. Application of these emulsions are only limited to specific beneficial attributes like silkiness, softness, reduced wet & dry combing force in 2-in-1 shampoo but are not so effective to improve the shine on hair. This dimethicone or dimethiconol or vinyldimethicone or vinyldimethiconol emulsion/s are not able to deliver even above said conditioning properties in anti dandruff shampoo and needs another additional silicone emulsion of different functionality like amodimethicone (amino silicone emulsion) in the formulation of different categories of conditioners to optimize on the conditioning effects. Another big disadvantage of dimethicone or dimethiconol or vinyldimethicone or vinyldimethiconol emulsion/s in case of shampoo formulations is that about 80% silicone is washed off while rinsing the hair in water with a maximum of 20% silicone deposition on hair. It is thus wastage of silicone, down-the-drain to pollute the environment.

Due to the lack of awareness, hair is exposed many rigorous and damaging chemical and physical processes during its lifetime. Hair damage results change in feel, appearance & physical properties of the hair and negative impact on the consumers satisfaction. Current products based on surface lubrication technologies & improve tactile benefits. Consumers experience and observe that the current product is an instant effect but doesn't last long.

Consumer needs to prevent these damage processes by way of using different appropriate hair washing products that target silicone deposition technologies. To eliminate or alleviate this consumer problem should lead to a product having high deposition on tips and less in roots. As it is well known in the art, a lipid layer covers the cuticles and protects the hair from damage. Due to continuous hair washing with different chemicals and physical treatment, lipid layer from normal hair gets removed and cuticle layer opens up. As soon as, cuticle layer opens, hair starts to get damaged very fast due to chemical used and by physical treatment if right product is not used for washing or hair treatment. During the damage process, hair tips become damage first and roots remains less damaged due to oily protection from sebum. Therefore, silicone deposition must be less in roots so that sebum can freely secretes from roots, otherwise hair fall takes place very fast. On the other hand, most of silicone used as mentioned above in hair care formulation is heterogeneously deposited on hair during washing and mostly transferred to roots rather than tips. Amino silicones thus has unique solution to resolve such above said problem. Properly designed amino silicone due to its cationic nature is predominantly deposited at tips and much less in roots. Hence, protect the damage hair from further damage.

Amino silicone emulsion is thus a highly popular category of silicone known for its use in different hair care formulations. Most important part of amino silicone is its application in wide conditioning formulations in different hair care products and irrespective of product categories, amino silicone emulsion improves softness, shine and wet combing of hair by way of its application in different types of hair care products. Amino silicone emulsion is available on different particle sizes in the range of 0.01 micron to 150 micron having low to moderate viscosity oil prepared by way of stirring or homogenizing in mechanical process. Amino silicone can be made by emulsion polymerization process by stirring or homogenizing with a particle sizes 0.01 micron to 150 micron having apparent internal oil viscosity from few hundred to few hundred thousand cps. This viscosity rise is not a true linear propagation of di-functional unit of siloxane bond but more of inter or intra molecular or both condensation due to presence of reactive groups in alpha omega positions in the polymer chain or hydrogen bonding of reactive groups at alpha omega position in the chain with amino group in the polymer chain i.e. cross linking of amino with siloxane in the form of trifunctional propagation. So, amino emulsion having higher fluid viscosity by emulsion polymerization process contains amino silicone polymeric oil having mostly resin type structure with a loss of amine functionality. Therefore, amino emulsion obtained by emulsion polymerization having particle sizes from 0.01 micron to 150 micron having polymers with cross-linking nature becomes less effective in conditioning properties due to the damage of amino groups as compared to emulsion made by the process of stirring or homogenizing amino oil, emulsifiers and water mechanically. Generally, making an aminosilicone polymeric fluid with more than 25000 cps is always a problem due to cross linking that ultimately gets gelled due to formation of resin structure.

EP0269889 by Norbert Gamon, EP 0628589 by Stevan Edward Cray & Mubarik M Chowdhry and U.S. Pat. No. 6,093,841 by Norbert Winkhofer & Holger Rautschek describes different processes for making amino silicone polymeric fluid. Non of the abovesaid prior art patents clearly defines how a stable high viscous amino silicone polymeric fluid is produced from amino silane and polysiloxane oligomer since highly viscous amino silane has an affinity towards condensation between themselves in having —OH group or —OR group at alpha omega position in amino fluid that forms hydrogen bond with the amino group.

There are still some other categories of silicone emulsions which are being used in different hair care products like poly ether modified silicone or poly quaternary silicones. All these products have mild conditioning properties with higher negative impact in hair care product.

Therefore all low viscous amino silicone emulsion results in poor silkiness and dry combing when used in different hair care products. So, to compensate for such properties, either a high oil viscosity containing dimethicone or dimethiconol or vinyldimethicone or vinyldimethiconol emulsion is added in combination to amino silicone emulsion. Still, these amino silicone emulsion with other silicone emulsion is not a solution in shampoo formulations due to extreme drop in shampoo viscosity for e.g. a shampoo base having viscosity 8000-10000 cps drops to below 100 cps after addition of low viscous amino silicone emulsion. Such negative aspects are associated with amino silicone emulsion added when alone or in combination with other silicone. Some times, a high amount of thickening agent is used to build up shampoo viscosity which not only increases formulation cost but also showed negative sensory effect on hair.

Nowadays, in global hair care market, shampoos as hair care products constitute more than 70% in comparison to other hair care products. Therefore, such negative properties of amino silicone are found to limit the use of such emulsions in different hair care applications.

On the other hand, amino silicone emulsion shows a positive advantage of maximum silicone transfer on hair due to its cationic nature as high as 50-60% by way of optimizing shampoo formulation in combination of suitable depositing agent. This high range of silicone deposition is impossible with other type of dimethicone or dimethiconol or vinyldimethicone or vinyldimethiconol silicone emulsion.

As would be apparent from the above state of the art and discussions therein, that it is a longfelt need to look for the possible application of amino silicone emulsion's in different hair care products, and it is thus essential not only to save the silicone from wastage while rinsing of hair in water but also have a possibility to use in all hair care applications if a stable linear high viscous amino fluid with a polymer viscosity min 60000 cps or above could be manufactured with a proper control of amine number and then use such amino silicone polymeric fluid to make high viscous amino silicone emulsion is such a way such that there is a minimum impact in shampoo viscosity observed after addition in shampoo formulation. These high viscosities amino silicone emulsions would thus provide for optimum conditioning effects in different hair care products without any negative sensory effect and diversify effective and advantageous use of silicone in hair care applications.

In is thus a basic object of the invention to provide for a stable high viscous amino silicone polymeric fluid and an emulsion thereof with reduced affinity of condensation between themselves so as to stabilize the said high viscous amino silicone polymeric fluid and the emulsion made out of it.

It is another object of the invention to provide for a process of making stable highly viscous amino silicone polymeric fluid having polymer viscosity of at least 50000 cps or more by way of a simple and cost-effective manufacturing process that would curtail the involvement of complex machine and thus can be readily used for making emulsion in large scale commercial process with particle sizes from 0.01 micron to 150 micron for diverse applications such as in personal care, specially hair care, textile, release and alike.

Another object of the invention is directed to provide a simple process of making high viscous amino silicone emulsion from stable high viscous amino silicone polymeric fluid that would not affect shampoo viscosity and would thus not limit its addition to different hair care products.

Another object of the invention is directed to provide a simple process of making high viscous amino silicone emulsion from stable high viscous amino silicone polymeric fluid that would enable maximum silicone deposition even on rinsing the hair while applying the hair care product containing the said emulsion that would aid in reducing the silicone wastage down-the-drain and into the environment.

Another object of the invention is directed to provide a simple process of making high viscous amino silicone emulsion from stable high viscous amino silicone polymeric fluid that would enable maximum silicone deposition on hair tip and less deposition on hair root even on rinsing the hair while applying the hair care product containing the said emulsion.

Another object of the invention is directed to provide a simple process of making silicone emulsion from stable high viscous amino silicone fluid that would provide excellent conditioning properties like soft, silky and shiny hair with excellent cleaning, volume and wet & dry combing.

Another object of the invention is directed to provide a simple process of making silicone emulsion from stable highly viscous amino silicone polymeric fluid that would provide excellent conditioning properties in different hair care product like shampoo, anti dandruff shampoo, hair conditioners, conditioner for hair colouring, hair cream and alike application.

Another object of the invention is directed to provide a simple process of making silicone emulsion from stable high viscous amino silicone polymeric fluid with viscosity range of from 50000 cps to 3 Mio cps by way of mixing or homogenising in emulsion machine after addition of amino fluid, emulsifiers and water or by way of mixing with the addition of emulsifiers and water after making stable high viscous amino fluid in the emulsion machine.

Another object of the invention is directed to provide a simple process of making high viscous amino silicone emulsion from stable high viscous amino silicone polymeric fluid that would maintain an amine number below 0.12.

Thus according to the basic aspect of the invention there is provided a stable highly viscous amino silicone emulsion comprising (i) a stable highly viscous amino silicone polymeric fluid of viscosity of at least 50000 cps to upto 2 Mio cps with an amine number of upto 0.12, (ii) non-ionic and/or (iii) cationic emulsifiers and said emulsion having a particle size of upto 150 micron.

According to another aspect of the invention there is provided a stable highly viscous amino silicone emulsion comprises highly viscous amino silicone polymeric fluid comprising hydrolysed amino silane solution free of alkoxy group in the alpha omega position in the amino silane of general formula

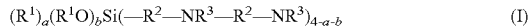

$(R^1)_a(R^1O)_b Si(-R^2-NR^3-R^2-NR^3)_{4-a-b}$ (I)

Wherein 'b' is the integer of maximum 3 and 'a' maximum 2;

Wherein $R^1$ is a monofunctional, saturated or unsaturated alkyl group with 1 to 20 carbon atoms or monofunctional aryl group with 6 to 20 carbon atoms;

Wherein $R^2$ is the difunctional alkylene group with 1 to 10 carbon atoms or difunctional aryl group with 6 to 10 carbon atoms;

Wherein $R^3$ is the hydrogen atom or atoms or saturated or unsaturated alkyl group with 1 to 20 carbon atoms or monofunctional aryl group with 6 to 20 carbon atoms.

According to yet another aspect of the present invention there is provided a stable highly viscous amino silicone emulsion wherein the said hydrolysed amino silane solution free of alkoxy group in the alpha omega position of the amino silanes are selected from $CH_3(CH_3O)_2-Si-C_3H_6-NH-C_2H_4-NH_2$; $CH_3(CH_3O)_2-Si-C_2H_4CH(CH_3)-NH-C_2H_4-NH_2$; $C_2H_5(CH_3O)_2-Si-C_4H_8-NH-C_3H_6-NHC_2H_5$ $(CH_3O)_2-Si-C_3H-NH-C_2H_4-NH_2$; $CH_3(C_2H_5O)_2-Si-C_3H_6-NH-C_2H_4-NH_2$; $CH_3(C_4H_9O)_2-Si-C_3H_6-NH-C_2H_4-NH_2$; $CH_3(CH_3O)_2-Si-C_3H_6-NCH_3-C_2H_4-N(CH_3)_2$; $CH_3(C_2H_5O)_2-Si-C_2H_4-CH(CH_3)-NH-C_2H_4-NH_2$; $CH_3(CH_5O)_2-Si-C_2H_4-CH(CH_3)-NH-C_4H_8-NH_2$; $CH_3(CH_3O)_2-Si-C_2H_4-CH(CH_3)-NH-C_2H_4-NHC_4H_9$, $CH_3(CH_3O)_2-Si-C_3H_6-NH_2$; $CH_3(C_2H_5O)_2-Si-C_3H_6-NH_2$; $CH_3(CH_3O)_2-Si-C_2H_4-CH(CH_3)-NH_2$; $CH_3(C_2H_5O)_2-Si-C_2H_4-CH(CH_3)-NH_2$; $CH_3(CH_3O)_2-Si-C_3H_6-N(CH_3)_2$; $CH_3(C_2H_5O)_2-Si-C_3H_6-NHCH_3$; $CH_3(CH_3O)_2-Si-C_3H_6-N(CH_3)_2$; $CH_3(CH_5O)_2-Si-C_3H_6-NHCH_3$; $CH_3(CH_3O)_2-Si-C_2H_4CH(CH_3)-N(CH_3)_2$; $CH_3(C_2H_5O)_2-Si-C_2H_4-CH(CH_3)-N(CH_3)_2$; $CH_3(CH_3O)_2-Si-C_2H_4-CH(CH_3)-NHCH_3$; $CH_3(C_2H_5O)_2-Si-C_2H_4-CH(CH_3)-NHCH_3$ and most preferably are selected from the silanes including $CH_3(CH_3O)_2-Si-C_3H_6-NH-C_2H_4-NH_2$; $CH_3(CH_3O)_2-Si-C_2H_4-CH(CH_3)-NH-C_2H_4-NH_2$; $CH_3(C_3H_5O)_2-Si-C_3H_6-NH-C_2H_4-NH$; $CH_3(C_2H_5O)_2-Si-C_2H_4-CH(CH_3)-NH-C_4H_8NH_2$; $CH_3(CH_3O)_2-Si-CH_6-NH_2$; $CH_3(C_2H_5O)_2-Si-C_3H_6-NH_2$; $CH_3(CH_3O)_2-Si-C_2H_4-CH(CH_3)-NH_2$ and $CH_3(C_2H_5O)_2-Si-C_2H_4-CH(CH_3)-NH_2$.

According to another preferred aspect of the invention there is provided a stable highly viscous amino silicone emulsion wherein the non-ionic emulsifiers of HLB value in between 5-19 are preferably selected from the category of polyoxyalkylene alkyl ether, polyoxyalkylene alkylphenyl ethers and polyoxyalkylene sorbitan esters, more preferably from the category of said non-ionic emulsifiers having HLB value in between 8-19 including polyethylene glycol octyl ether; Polyethylene glycol lauryl ether; Polyethylene glycol tridecyl ether; Polyethylene glycol isotridecyl ether, Polyethylene glycol cetyl ether; Polyethylene glycol cetostearyl ether, Polyethylene glycol stearyl ether; polyethylene glycol nonylphenyl ether; polyethylene glycol dodecylphenyl ether; polyethylene glycol cetylphenyl ether; polyethylene glycol stearylphenyl ether; polyethylene glycol sorbitan mono stearate and polyethylene glycol sorbitan mono oleate, more preferably from the category of the said non-ionic emulsifiers having HLB value in-between 8-17, yet preferably from the category of the said non-ionic emulsifiers with HLB value 10-14 by selecting different non-ionic emulsifiers with HLB values from 8-17 and wherein the cationic emulsifiers are selected from, tetra alkyl ammonium halides, tetra aryl ammonium halides, tetra alkyl aryl ammonium halides, also including salt, Quaternary ammonium compound including salt, polyquaternium compound having INCI name polyquaternium 1 to 75 and alike in use together with said non-ionic emulsifiers.

In yet further aspect of the invention there is provided a process for the synthesis of a said stable high viscous amino silicone emulsion comprising the steps of:

i. providing a stable high viscosity amino silicone polymeric fluid with viscosity in the range of 50000 cps to 2 Mio cps;

ii. adding the said stable high viscosity amino silicone polymeric fluid thereof in an amount 20 to 60% by wt together with non-ionic emulsifiers having HLB in the range of 10-14 comprising mixture of non-ionic emulsifiers in an amount 2 to 20% by wt and water in an amount 35 to 75% by wt and/or an cationic emulsifier/s in an amount from zero to 7% by wt.; more preferably, 25 to 50% by wt amino silicone polymeric fluid together with non-ionic emulsifiers having HLB in the range of 10-14 comprising mixture of non-ionic emulsifiers in an amount 5 to 20% by wt and water in an amount 26 to 70% by wt and/or an cationic emulsifier/s in an amount from 0 to 4% by wt.;

iii. homogenizing the mix by combination of stirrer and homogenizer at a temperature range of 10 to 40° C. and obtaining the said emulsion therefrom.

A yet preferred aspect of the process of the invention involves more than one emulsifier with combined HLB value between 8-14 facilitates the synthesis of a stable emulsion.

Advantageously, in the above said process depending on the particle size requirement in the final emulsion, stirrer or homogenizer or combination of both is used for synthesizing the said stable emulsion and wherein the stirrer includes turbine, paddle, propeller, viscojet or alike and not limited to specified stirrers and wherein homogeniser includes turrax or rotor-stator type homogenizer or alike and not limited to specified homogeniser.

More advantageously, in the above said process the stability of the emulsion remarkably improves by the addition of organic acid to adjust the final emulsion pH toward acidic pH and wherein the preferable organic acids include formic acid, acetic acid, Propionic acid, Isopropionic acid, butyric acid, Isobutyric acid, tert-butyric acid, Pentanoic acid and isomers, Hexanoic acid and isomers, Heptanoic acid and isomers, Octanoic acid and isomers and most preferable acid is acetic acid.

Also, in the above said process maintaining a temperature in the range of 10 to 40° C. is suitable while making emulsion preferably, maintaining a temperature below 20° C. is suitable to generate particle size of under 1000 nm in the emulsion and for emulsion having particle size more than 1000 nm, higher temperature around 40° C. is required.

Further in the above said process for the synthesis of a stable high viscous amino silicone emulsion with particle size below 1000 nm, comprising the steps of:

i. Adding emulsifiers in the emulsion tank by taking a small portion of water in the emulsion tank; minutes followed by addition of desired quantity of the amino fluid ii. Mixing of the water and emulsifiers for few and homogenizing the mix until it becomes a thick paste;

iii. Adding the rest of the water in a controlled manner followed by homogenizing the mix after each addition of water;

iv. Adding biocide at the level of 15 ppm for preserving the emulsion against microbial contamination and obtaining the said emulsion.

Also, in the said process for the manufacture of a stable high viscous amino silicone emulsion with particle size above 1000 nm, comprising the steps of:

i. Adding total water and emulsifiers in the tank wherein depending on the type of emulsifiers, temperature of the mixture was increased so that emulsifiers dissolve in water;

ii. Cooling the emulsifier/s solution below 40° C.;

iii. Adding desired quantity of high viscous amino fluid in the emulsion tank and stirred until desired particle size achieved in the emulsion wherein for high particle emulsion, viscojet stirrer being more preferable to achieve very stable emulsion and narrow distribution of particle size;

iv. Adding the biocide at the level of 15 ppm for preserving emulsion against microbial contamination and obtaining the said emulsion.

In another aspect of the present invention there is provided a stable highly viscous amino silicone polymeric fluid of viscosity of at least 50000 cps to upto 2 Mio cps and an amine number of upto 0.12 comprising of hydrolysed amino silane solution free of alkoxy and hydroxyl groups in alpha omega position of the amino silane molecule.

In yet another aspect of the present invention a process for the synthesis of highly viscous amino silicone polymeric fluid is provided comprising the steps of i. reacting the hydrolysed amino silane solution with the linear oligomer of organopolysiloxane or organocyclosiloxane or mixture thereof together with a polymer chain stopper in presence of alkaline catalyst at 70-150° C. and preferably in the temperature range of 100-140° C. under $N_2$ atmosphere;

ii. Neutralizing the polymer after completion of the reaction with acidic organic compound compatible with the said amino silicone polymer;

iii. Removing the volatiles in the amino silicone polymer by vacuum stripping at 110 to 220° C. and most preferably vacuum stripping in the temperature range of 150-180° C. and obtaining the said amino silicone polymer thereof that was then cooled to room temperature under vacuum after completion of stripping.

In another preferred aspect of the above said process for the synthesis of highly viscous amino silicone polymeric fluid, the linear oligomer of organopolysiloxane used is of the general formula, $OH(R^1R^1SiO)_nH$ Wherein $R^1$ is the monofunctional, saturated or unsaturated alkyl group with 1 to 20 carbon atoms or monofunctional aryl group with 6 to 20 carbon atoms. Most preferably $R^1$ group is the methyl group;

Wherein n is the integer vary from 5 to 500 and most preferably varying from 10 to 60;

Wherein Organocyclosiloxane is of the general formula, $(R^1R^1SiO)_m$

Wherein $R^1$ is the monofunctional, saturated or unsaturated alkyl group with 1 to 20 carbon atoms or monofunctional aryl group with 6 to 20 carbon atoms, most preferably methyl group;

Wherein m is the integer vary from 4 to 10 with most preferable values varying from 4 to 5.

In another preferred aspect of the above said process for the synthesis of highly viscous amino silicone polymeric fluid the polymer chain stopper is a mono functional organic radical or organic group or a short chain organic polymer having mono function group attached at α, ω position most preferably hexamethyldisiloxane or short chain polydimethyl siloxane having trimethyl siloxy groups attached at α, ω position.

In yet another preferred aspect of the above said process for the synthesis of highly viscous amino silicone polymeric fluid the alkaline catalyst is alkaline metal hydroxide or alkoxide or quaternary salts or suitable polymerization catalyst especially potassium or caesium methoxide or ethoxide preferable catalyst for making high viscous amino emulsion.

In a further preferred aspect of the above said process for the synthesis of highly viscous amino silicone polymeric fluid the quantity of the hydrolysed amino silane solution in the reaction mixture is dependent on amine number requirement of the final high viscous aminosilicone polymeric fluid and wherein the requirement of the said amine number is upto 0.12 and preferably within 0.06 is required for the synthesis of the said stable highly viscous aminosilicone polymer and wherein the hydrolysed amino oligomer in an amount of 0.5 to 4% by wt. is added in the reaction mixture to control amine number of the said stable highly viscous amino silicone polymer below 0.12 wherein the said amount is again dependent on type of amino oligomer, concentration of the oligomer in solvent after hydrolysis.

In another aspect of the present invention there is provided a hydrolysed amino silane solution for its application in viscous conditioning formulations and free of alkoxy group in the alpha omega position in the amino silane of general formula

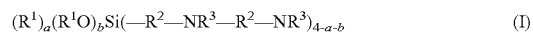

$(R^1)_a(R^1O)_bSi(-R^2-NR^3-R^2-NR^3)_{4-a-b}$ (I)

Wherein 'b' is the integer of maximum 3 and 'a' maximum 2;

Wherein $R^1$ is a monofunctional, saturated or unsaturated alkyl group with 1 to 20 carbon atoms or monofunctional aryl group with 6 to 20 carbon atoms;

Wherein $R^2$ is the difunctional alkylene group with 1 to 10 carbon atoms or difunctional aryl group with 6 to 10 carbon atoms;

Wherein $R^3$ is the hydrogen atom or atoms or saturated or unsaturated alkyl group with 1 to 20 carbon atoms or monofunctional aryl group with 6 to 20 carbon atoms.

In yet another preferred aspect of the present invention wherein the hydrolysed amino silane solution involves the amino silanes for hydrolysis that are selected from $CH_3(CH_3O)_2-Si-C_3H_6-NH-C_2H_4-NH_2$; $CH_3(CH_3O)_2-Si-C_2H_4-CH(CH_3)-NH-C_2H_4-NH_2$; $C_2H_5(CH_3O)_2-Si-C_4H_8-NH-C_3H_6-NHC_2H_5$; $C_2H_5(CH_3O)_2-Si-C_3H_6-NH-C_2H_4-NH_2$; $CH_3(C_2H_5O)_2-Si-C_3H_6-NH-C_2H_4-NH_2$;

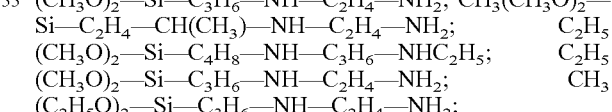

$CH_3(C_4H_9O)_2-Si-C_3H_6-NH-C_2H_4-NH_2$; $CH_3(CH_3O)_2-Si-C_3H_6-NCH_3-C_2H_4-N(CH_3)_2$; $CH_3(C_2H_5O)_2-Si-C_2H_4-CH(CH_3)-NH-C_2H_4-NH_2$; $CH_3(C_2H_5O)_2-Si-C_2H_4-CH(CH_3)-NH-C_4H_8-NH_2$; $CH_3(CH_3O)_2-Si-C_2H_4-CH(CH_3)-NH-$

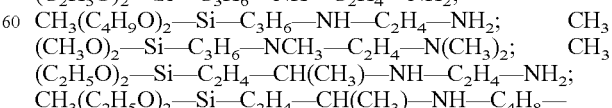

$C_2H_4-NHC_4H_9$, $CH_3(CH_3O)_2-Si-C_3H_6-NH_2$; $CH_3(C_2H_5O)_2-Si-C_3H_6-NH_2$; $CH_3(CH_3O)_2-Si-C_2H_4-CH(CH_3)-NH_2$; $CH_3(C_2H_5O)_2-Si-C_2H_4-CH(CH_3)-$

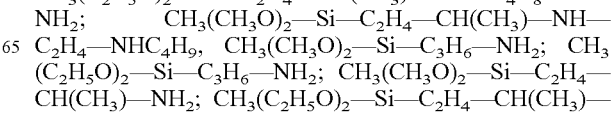

NH$_2$; CH$_3$(CH$_3$O)$_2$—Si—C$_3$H$_6$—N(CH$_3$)$_2$; CH$_3$(C$_2$H$_5$O)$_2$—Si—C$_3$H$_6$—NHCH$_3$; CH$_3$(CH$_3$O)$_2$—Si—C$_3$H$_6$—N(CH$_3$)$_2$; CH$_3$(C$_2$H$_5$O)$_2$—Si—C$_3$H$_6$—NHCH$_3$; CH$_3$(CH$_3$O)$_2$—Si—C$_2$H$_4$—CH(CH$_3$)—N(CH$_3$)$_2$; CH$_3$(C$_2$H$_5$O)$_2$—Si—C$_2$H$_4$—CH(CH$_3$)—N(CH$_3$)$_2$; CH$_3$(CH$_3$O)$_2$—Si—C$_2$H$_4$—CH(CH$_3$)—NHCH$_3$; CH$_3$(C$_2$H$_5$O)$_2$—Si—C$_2$H$_4$—CH(CH$_3$)—NHCH$_3$ and most preferably obtained from the silanes such as CH$_3$(CH$_3$O)$_2$—Si—C$_3$H$_1$—NH—C$_2$H$_4$—NH$_2$; CH$_3$(CH$_3$O)$_2$—Si—C$_2$H$_4$—CH(CH$_3$)—NH—C$_2$H$_4$—NH$_2$; CH$_3$(C$_2$H$_5$O)$_2$—Si—C$_3$H$_6$—NH—C$_2$H$_4$—NH$_2$; CH$_3$(C$_2$H$_5$O)$_2$—Si—C$_2$H$_4$—CH(CH$_3$)—NH—C$_4$H$_8$—NH$_2$; CH(CH$_3$O)$_2$—Si—CH$_6$—NH$_2$; CH$_3$(C$_2$H$_5$O)$_2$—Si—C$_3$H$_6$—NH$_2$; CH$_3$(CH$_3$O)$_2$—Si—C$_2$H$_4$CH(CH$_3$)—NH$_2$ and CH$_3$(C$_2$H$_5$O)$_2$—Si—C$_2$H$_4$—CH(CH$_3$)—NH$_2$.

In a yet further aspect of the present invention there is provided a process for the preparation of the hydrolysed amino silane solution free of alkoxy group in the alpha omega position of the said silane molecule comprising the steps of:

i. Dissolving the silane in an organic solvent in the concentration range of upto 20% preferably selected from aromatic solvents including toluene, xylene or aliphatic solvent including octane or cyclosiloxane including octamethyl cyclosiloxane, decamethylcyclopentasiloxane or any other higher cyclosiloxane or mixture thereof or low viscous silicone oil most preferable solvents being cyclosiloxane and particularly octamethylcyclotetrasiloxane;

ii. Adding water in a stoichiometric amount half mole in respect of 'b' in the said silane of general Formula I and in controlled amount in nitrogen atmosphere in a temperature range of 50-130° C. preferably in the temperature range of 60 to 100° C. to split the alcoxy group completely from silane molecule;

iii. Distilling out the alcohol from the reaction mixture, cooling the reaction mixture and obtaining the said hydrolysed silane solution thereof.

As discussed hereinbefore the present invention provides for stable high viscous amino silicone polymeric fluids and emulsions thereof and its process of manufacture. The present invention particularly relates to synthesis of the highly viscous amino silicone polymeric fluid with polymer viscosity of at least 50000 cps and emulsions made out of it with particle size in the range of 0.01-150 micron suited for diverse applications in products related to personal care such as hair care, textile, release and the like.

Importantly, it is found by way of the present invention that one of the critical aspects, which enable producing the stable linear high viscous amino silicone polymeric fluid is to control the amine number of the said polymeric fluid which has an important role to stabilize the fluid when polymer attains high viscosity. Type of catalyst, quantity of catalyst employed in the said process of synthesis also plays an important role to stabilize the said high viscosity amino fluid. Quantity of amino silane oligomer used while synthesizing the said amino silicone polymeric fluid also controls the stability final viscosity, stability of the emulsion and emulsion performance in end use applications especially in personal care application and more importantly in hair care product without showing any negative sensory effect.

Advantageously, it is also found by way of the present invention that the same enables the production of an emulsion of high viscous amino silicone polymeric fluid by a simple process due to selective use of emulsifiers. Also the quantity of the emulsifiers has great role to make the emulsion stable. In particular, the above process of making high viscous amino silicone emulsion of different particle sizes is stabilized by use of surfactants having a critical HLB values that help to make faster desired particle size emulsion by using simple high shear mixer without the need for complex a high capital shear mixer. It is also important to control temperature for achieving desired particle size with narrow distribution of the particle wherein to make the emulsion in between 20 to 40° C. helps to quickly achieve desired particle size high viscous amino silicone emulsion.

Moreover, the present invention further identifies the importance of the selective use of non-ionic emulsifier by way of a mixture of non-ionic having HLB value of the mixture in-between 5 to 15 shows optimum combinations to make stable different particle stable emulsion with a help of simple high shear mixer. Furthermore, the addition of the cationic emulsifiers optimizes the performance of the emulsion in final applications as found by way of the present invention.

The three major steps leading to the applications of the high viscous amino silicone emulsion made by the process of the present invention are accomplished in the following stages involving:

1. Synthesis of highly viscous stable amino silicone polymeric fluids
2. Making of emulsions by utilizing the said high viscous amino silicone polymeric fluids with different particle sizes
3. Applications of the said high viscous amino silicone emulsion The details of the invention, its nature and objects are explained hereunder in greater detail in relation to the following non-limiting examples.

EXAMPLE 1

Synthesis of High Viscous Stable Amino Silicone Polymeric Fluids

According to the present invention, synthesis of highly viscous amino silicone emulsion comprises of the following steps, a. Hydrolysis of alcoxy group of amino silane in cyclosiloxane or in other low viscous silicone oil
b. Synthesis of highly viscous amino silicone polymeric fluid by using the hydrolyzed amino silane solution of step 'a' above, silicone cyclosiloxane or short chain silicone oligomer or mixture thereof and α, ω-trialkyl siloxy siloxane in presence of an alkaline catalyst.

EXAMPLE 1a

Hydrolysis of Alcoxy Group of Amino Silane Molecule in Low Viscous Silicone Solvent According to the present invention, amino silane used for hydrolysis has the general formula I $$(R^1)_a(R^1O)_b Si(-R^2-NR^3-R^2-NR^3)_{4-a-b} \qquad (I)$$

For hydrolysing the silane represented by the general Formula I, first, maximum 50% of the silane is dissolved in suitable solvent wherein silane becomes clearly soluble. Preferably the concentration of the silane in the solvent is maintained to upto a maximum of 20% for carrying out total splitting of alcoxy groups attached to silane molecule. Concentration of the amino silane is thus an important aspect for complete splitting of the alcoxy groups completely from the silane molecule. With increasing the concentration of silane, solubility of hydrolysed silane starts to decrease and as the solubility starts to decrease, splitting of alcoxy group from silane also become difficult. If hydrolysis is carried out in presence of insoluble hydrolysed silane, then after addition of water, hydrolysed silane gets gelled after some time. The main object of the present invention is to achieve alcoxy group free hydrolysed silane solution so that it can use in the second stage of reaction easily that would be free of alcoxy groups in alpha omega position during the synthesis of high viscous amino fluid. Solvents to solubilise silane are aromatic solvents such as toluene, xylene or the like or aliphatic solvent like octane or the like or cyclosiloxane like octamethyl cyclosiloxane, decamethylcyclopentasiloxane or any other higher cyclosiloxane or mixture thereof or low viscous silicone oil. According to the present invention, most preferable solvent is cyclosiloxane and particularly octamethylcyclotetrasiloxane. Water requirement is stoichiometrically half mole in respect of 'b' in the silane of general Formula I to split the alcoxy group completely from silane molecule.

Hydrolysis is carried out at a temperature of 50-130° C. with controlled addition of water under nitrogen atmosphere. Most preferable temperature according to the present invention for hydrolysis varies from 60 to 100° C. After addition of water, the reaction is continued until all alcohol come out from the reaction kettle. The reaction kettle was cooled and the amine number of the liquid in the kettle was measured. This amino number is required in the next stage of reaction to set the quantity of hydrolyzed amino silane solution required for carrying out the synthesis of high viscous amino fluid with desired amino number in the final high viscous amino fluid.

EXAMPLE 1b

Synthesis of High Viscous Amino Silicone Polymeric Fluid from Hydrolyzed Amino Silane Solution Synthesis of stable high viscous amino silicone polymeric fluid has two major aspects;
i) to synthesise hydrolyzed amino silane solution free from alcoxy group for making high viscous amino silicone polymeric fluid with no alcoxy termination and also to ensure during the synthesis of the said hydrolysed amino silane that there is no gellation of hydrolyzed amino silane oligomer after losing the said alcoxy group. Both these factors are important for making stable hydrolysed amino silane oligomer and stable high viscous amino silicone polymeric fluid. The hydrolysed amino silane produced as described above improves the stability of high viscous amino silicone polymeric fluid by restricting inter molecular condensation of terminal hydroxyl or alcoxy group also reduce the chance of hydrogen bonding with terminal reacting group such as amino group in the side chain.
ii) stabilising the said high viscous amino silicone polymeric fluid by controlling intra or inter molecular hydrogen bonding between the side chain amino groups. Therefore, it is important to select an amine number of the highly viscous aminosilicone polymeric fluid in such way that number of amino groups placed in the chain from one amino and distance with respect to another amino is long enough to reduce the chance of hydrogen bonding between the said amino groups as they are placed beyond the hydrogen bonding distance. According to present invention, high viscosity amino silicone polymeric fluid within amine no 0.12 shows excellent stability on polymer viscosity. More particularly, amine number within 0.06 is most preferable for the synthesis of stable high viscous amino fluid.

The synthesis of said high viscous amino silicone is carried out by reacting the linear oligomer of organopolysiloxane or organocyclosiloxane or mixture thereof together with hydrolysed amino silane as above and a polymer chain stopper in presence of alkaline catalyst at 70-150° C. under $N_2$ atmosphere. After completion of the reaction, the polymer is neutralized with acidic organic compound which is compatible with amino silicone polymer. Volatiles in the amino silicone polymer are removed by vacuum stripping at 110 to 220° C. The amino silicone polymer was then cooled to room temperature under vacuum after completion of stripping.

Polymerisation of linear organopolysiloxane or organocyclosiloxane or mixture thereof with hydrolysed amino silane and chain stopper is carried out at 70-150° C. under $N_2$ atmosphere in presence of alkaline catalyst with the most preferable temperature range of 100-140° C. After completion of reaction, the high viscous amino silicone polymer is neutralised with acidic organic compound and most preferably with silyl phosphate.

Volatiles from the polymer is stripped out under vacuum at 110 to 220° C. and most preferably ranges from 150 to 180° C.

According to the process of the present invention to prepare the high viscous amino fluid, the quantity of chain stopper required is dependent on the final amino silicone polymer viscosity targeted. Amino silicone polymer viscosity of at least 50000 cps upto 2 Mio cps is safely synthesized without any gel formation by controlled addition of chain stopper with most preferred viscosity range of from 200000-500000 cps that can be utilized for various different applications.

EXAMPLE 1c

Emulsion Making of Highly Viscous Amino Silicone Polymeric Fluids with Different Particle Size According to the present invention, a wide range of high viscous amino silicone emulsions having particle sizes upto 150 micron (high particle emulsion) are formulated in together with non-ionic emulsifiers or mixture of non-ionic and cationic emulsifiers by using simple stirring system or by high speed homogenizer.

It is also observed according to the present invention, two different types of emulsifiers system require for two ranges of particle sizes. For particle sizes below 1000 nm of high viscous amino silicone emulsion, non-ionic emulsifiers having HLB value in between 5-19 are suitable to make the emulsion process simpler. Most useful surfactants of this category are polyoxyalkylene alkyl ether, polyoxyalkylene alkylphenyl ethers polyoxyalkylene sorbitan esters. More precisely, some useful surfactants having HLB value in between 8-19 are polyethylene glycol octyl ether; Polyethylene glycol lauryl ether; Polyethylene glycol tridecyl ether; Polyethylene glycol isotridecyl ether, Polyethylene glycol cetyl ether; Polyethylene glycol cetostearyl ether, Polyethylene glycol stearyl ether; polyethylene glycol nonylphenyl ether; polyethylene glycol dodecylphenyl ether; polyethylene glycol cetylphenyl ether; polyethylene glycol staerylphenyl ether; polyethylene glycol sorbitan mono stearate and polyethylene glycol sorbitan mono oleate. It is also preferable non-ionic surfactant having HLB value in-between 8-17 is useful to make high viscous amino silicone emulsion by using simple shear mixer in shorter period and it is also art of this invention to use 10-14 HLB emulsifier system by selecting different non-ionic surfactants having HLB values from 8-17 for making stable high viscous amino silicone emulsion. It is also important art of the invention to use a defined amount amino oil and emulsifier for making stable high viscous amino oil emulsion. Generally, 20 to 60% by wt amino silicone fluid together with non-ionic emulsifiers having HLB in the range of 10-14 comprising mixture of non-ionic emulsifiers in an amount 2 to 20% by wt and water in an amount 35 to 75% by wt and/or an cationic emulsifier/s in an amount from zero to 7% by wt. More particularly, 25 to 50% by wt amino silicone fluid together with non-ionic emulsifiers having HLB in the range of 10-14 comprising mixture of non-ionic emulsifiers in an amount 5 to 20% by wt and water in an amount 26 to 70% by wt and/or an cationic emulsifier/s in an amount from zero to 4% by wt. It is important to use more than one emulsifier with combined HLB value between 8-14 for making stable emulsion.

For particle sizes above 1000 nm of high viscous amino silicone emulsion, non-ionic emulsifiers having HLB value in between 5-19 are suitable to make the emulsion process simpler. Most useful surfactants of this category are polyoxyalkylene alkyl ether, polyoxyalkylene alkylphenyl ethers and polyoxyalkylene sorbitan esters. More precisely, some useful surfactants having HLB value in between 8-19 are polyethylene glycol octyl ether; Polyethylene glycol lauryl ether; Polyethylene glycol tridecyl ether; Polyethylene glycol isotridecyl ether, Polyethylene glycol cetyl ether; Polyethylene glycol cetostearyl ether, Polyethylene glycol stearyl ether; polyethylene glycol nonylphenyl ether; polyethylene glycol dodecylphenyl ether; polyethylene glycol cetylphenyl ether; polyethylene glycol staerylphenyl ether; polyethylene glycol sorbitan mono stearate and polyethylene glycol sorbitan mono oleate. It is also preferable non-ionic surfactant having HLB value in-between 8-17 is useful to make high viscous amino silicone emulsion by using simple shear mixer in shorter period and it is also art of this invention to use 8-14 HLB emulsifier system by selecting different non-ionic surfactants having HLB values from 6-15 for making stable high viscous amino silicone emulsion. It is also important art of the invention to use a defined amount amino oil and emulsifier for making stable high viscous amino oil emulsion. Generally, 20 to 60% by wt amino silicone fluid together with non-ionic emulsifiers having HLB in the range of 8-14 comprising single emulsifier or mixture of non-ionic emulsifiers in an amount 2 to 20% by wt and water in an amount 35 to 75% by wt and/or an cationic emulsifier/s in an amount from zero to 7% by wt. More particularly, 30 to 60% by wt amino silicone fluid together with non-ionic emulsifiers having HLB in the range of 8-14 comprising mixture of non-ionic emulsifiers in an amount 2 to 10% by wt and water in an amount 27 to 68% by wt and/or an cationic emulsifier/s in an amount from 0.1 to 3% by wt. It is important to use more than one emulsifier with combined HLB value between 8-14 for making stable emulsion.

It is also observed the stability of the emulsion remarkably improved by the addition of organic acid and adjust final emulsion pH toward acidic pH.

Further addition of a biocide at the end of the emulsion making process helps to protect the emulsion from microbial contamination.

Another important aspect of the process of the present invention is to control temperature while making emulsion of high viscous amino oil. Maintaining a temperature in the range of 10 to 40° C. is suitable while making emulsion. More particularly, maintaining a temperature below 20° C. is suitable while making emulsion to generate particle size of under 1000 nm and for emulsion having particle size more than 1000 nm, higher temperature around 40° C. is required for dispersing waxy type emulsifier/s.

The process of making a highly viscous amino silicone emulsion having particle size below 1000 nm, comprises the steps of: a small portion of water is taken in the emulsion tank and emulsifiers are added in the tank. The water and emulsifiers are mixed for few minutes. Then, desired quantity of the amino fluid was added in the tank and the mixture was homogenized till the mixture become thick paste. Then, the rest of the water was added in a controlled manner and the mixture was homogenized after each addition of water. Finally, biocide was added for preserving the emulsion against microbial contamination; whereas for making amino silicone emulsion having particle size above 1000, first total water and emulsifiers transfer in the tank and depending on the type of emulsifiers, temperature of the mixture was increased so that emulsifiers dissolve in water. Then, the emulsifier/s solution was cooled below 40° C. Desired quantity of high viscous amino fluid in the emulsion tank was added and continued to stir till desire particle size was achieved in the emulsion. For high particle emulsion, viscojet stirrer is more preferable to achieve very stable emulsion and narrow distribution of particle size. Viscosjet is useful to control temperature of the emulsion during stirring since viscojet generates minimum heat while mixing the emulsion. Finally, add biocide for preserving emulsion against microbial contamination.

EXAMPLE 2

Applications of High Viscous Amino Silicone Emulsion

High viscous amino silicone emulsions have wide applications including personal care, home care, textile, paper coating, release etc. In personal care, especially in hair care, when finished products formulated with high viscous amino silicone emulsions showed a wide range of sensory (softness, body, volume, shine), detangling, control depositions, foam controls benefits. The high viscous amino silicone emulsions obtained by way of the present invention are similarly effective in different hair care formulations like 2-in-1 shampoo, Hair conditioner, Hair gel, Hair colour conditioner and are not limited to said applications only.

According to the present invention, high viscous amino silicone emulsions are not only deliver different conditioning benefits but also minimizes the negative effect like drop in shampoo viscosity that is normally observed particularly in case of low viscous amino fluid below 50000 cps. It is also an art of the present invention to optimize the effect of high viscous amino silicone emulsion used in hair care formulation together with depositing agent having INCI name polyquaternium 1 to 75 and/or Cationic polymer including salt and/or Quaternary ammonium compound including salt.

According to the present invention, high viscous amino silicone emulsions are not only deliver the excellent conditioning properties but also repair the damage hair in together with suitable deposition agent via more deposit on damage hair and less on non-damage hair. For these control deposition or target deposition, different cationic depositing agents found suitable for optimum deposition. Most preferable one is Polyquaternium 07.

High viscous amino emulsion stability test in shampoo formulations are carried out at 45° C. for 90 days in air circulating oven and viscosity measured at regular interval by Brookfield viscometer at 25° C.

EXAMPLE 2a

Treatment of Hair Tresses with 2-in-1 Shampoo

Take 15 gms of hair tress (having length 15 cm) to be tested and immerse in Pet-ether (60-80° C. boiling range) for 1 hr. After 1 hr boiling, dry the hair in open air. Then wash with SLES. Dry again in open air.

Take half portion of the shampoo to be applied (0.1 gm of shampoo/g of hair) and apply it along the whole length of the tress for 30 s. Keep it untouched for 30 s. Then wash it off properly. Again apply the rest portion of the shampoo in similar way for 30 s and keep it untouched for 30 s. Then finally wash it off with water properly. Then dry the hair tresses.

EXAMPLE 2b

Combing Force Evaluation by Machine (Tinius Olsen Materials Testing Machine)

Measure the force of hair after setting the following parameters in the instrument.

Load range=80 N, Extension range=130 mm, Speed=100 mm/min, Unit load=70N

Measure combing force of the hair tresses treated with shampoo containing silicone and without silicone in dry & wet condition.

EXAMPLE 2c

Frictional Force Force Evaluation by Machine (Tinius Olsen Materials Testing Machine)

Measure the friction of hair after setting the following parameters in the instrument.

Load range=1 N, Extension range=130 mm, Speed=100 mm/min, Sled wt=0.1

Endpoint=120 mm, Mean peak size=0.3N

Measure frictional force of the hair tresses treated with shampoo containing silicone and without silicone in dry & wet condition.

EXAMPLE 2c

Frictional Force Force Evaluation by Machine (Tinius Olsen Materials Testing Machine)

Measure the friction of hair after setting the following parameters in the instrument.

Load range=1 N, Extension range=130 mm, Speed=100 mm/min, Sled wt=0.1

Endpoint=120 mm, Mean peak size=0.3N

Measure frictional force of the hair tresses treated with shampoo containing silicone and without silicone in dry & wet condition

EXAMPLE 2d

Study of Gloss of Hair by GTI Minimatcher

Take the treated hair tresses and place on the viewing surface. The hair tresses are observed under three lighting conditions—store light, incandescent light and daylight fluorescent light.

EXAMPLE 2e

Measurement of the Foam Profile of Shampoo

First take 1.75 gm of shampoo and dissolve it in 500 ml of DM water. Take the prepared solution in 1500 ml measuring cylinder of contifoam. Then switch on the machine and set the following parameters as follows; pump speed: 150 lit/hr, pumping time=20 sec and total machine running time=1800 sec and then study and compare the foam profile. From the profile report, note the foam height after pump off.

EXAMPLE 2f

Measurement of Silicone Deposition on Hair

Take the hair tresses to be tested and immerse in Pet-ether (60-80° C. boiling range) for 3 hrs. Then dry hair in open air. These will be treated as damaged hair. For normal hair tresses wash with 1% SLES solution. Dry in open air. The hair samples are ready for nest step of treatment. Cut the hair tresses into many switches as per the requirement. The hair switches are rinsed under running water at 35-40° C. with a controlled flow rate set at 4 l/min 0.1 g shampoo/g of hair is applied along the length of the switches which are agitated/massaged for 30 seconds. The switches are rinsed under the running water for 30 seconds during which the operator runs a thumb and forefinger along the length of the switch every 5 seconds. The procedure is repeated a second time. Dry the hair tresses. Cut the hair tresses into small pieces. Weight of the hair taken should be in between 1-1.5 g.

Also take a bare hair both normal and damaged without silicone for comparison. The hair tresses are then analysed in X-Ray Fluorescence analyser.

EXAMPLE 2g

Salon Study

Salon test was performed on 14 volunteers with half the hair on the volunteers studied against control and half the hair studied with newly developed products.

Execution of the activity study involved the following steps:

1. The hair was divided into 2 parts;
2. 1st Half of the hair was wetted;
3. 4 ml Shampoo is taken in Syringe from test shampoo;
4. A line of shampoo was drawn on the hair with the syringe;
5. Lather was generated for 2 minutes exactly;
6. The lather was collected in a broad mouth cylinder by squeezing out the shampoo from hair;
7. The hair was rinsed clean. The time noted should be maintained for the second part of hair;
8. Dry The hair was dried with towel;
9. Standard comb was taken and combed until the hair was free of knots. The time was noted and recorded as Wet Combing.
10. The feel of hair for clean, squeaky clean, oily feel, softness & silkiness was also noted;
11. The same process was followed with the next half of hair with control [points 2-10];
12. The hair was dried under a table fan;
13. Points 9 and 10 was followed again and noted as Dry Combing & other properties;
14. Checking for Flyaway was done by placing the comb 2 inch above air and the portion of the hair was observed that gets affected by static charge;
15. Gloss, shine on the hair was checked in black room under incessant light.

EXAMPLE 3a

Reaction Conditions for Working Examples Under Tables 1 & 2

All reactions in Table 1 & 2 were carried in a 7 lit SS reactor equipped with pitched blade turbine stirrer with mechanical seal and having sufficient power that could stir low viscous as well high viscosity amino fluid. Reactor is also equipped with temperature control system with jacketed heating and cooling system. Reactor also connected with small high efficient tube condenser with reflux system and a receiver connected at bottom of condenser. Reactor is also equipped to work under $N_2$ blanketing and also under vacuum upto—760 mm Hg and also under pressure upto 10 bars.

In the table 1, first stage means took all ingredients in the reactor and then carried reaction as mentioned in $1^{st}$ stage reaction condition. $2^{nd}$ stage means took all ingredients in the reactor those mentioned in $2^{nd}$ stage after completion of $1^{st}$ stage of reaction. In table 1, where stages are not mentioned, took all ingredients together in the reactor and carried out reactor as mentioned in reaction condition. Similarly, in the table 2, all reactants took in the reactor and carried out reactor as mentioned in reaction condition. All reactions were carried out under N2 blanket otherwise any other condition mentioned in reaction condition.

EXAMPLE 3b

Reaction Conditions for Working Examples Under Tables 3 & 4

In case of emulsion making by turrax, water part was taken as mentioned in the said table in a container. Then emulsifiers were added and mixed for few minutes to disperse emulsifiers in water. Then, viscous amino fluid was added first and then, all other ingredients were added as mentioned in the table with mixing time. Then, the steps for water addition were followed as per instruction in the table. A jacketed container was used which connected with controlled water bath for controlling the temperature of the emulsion.

In case of preparing the emulsion by viscojet, all ingredients were taken in the emulsion container except the viscous amino fluid and mixed for few minutes to disperse emulsifiers in water. Then, the amino fluid was added and continued to mix as per instruction mentioned in the said table. Finally, other ingredients were added with time of mixing as mentioned in the table. A jacketed container was used which connected with controlled water bath for controlling temperature of the emulsion.

TABLE 1

Hydrolysis of Silane

| Exples | Amino silane | Siloxane | Water | Cat-Y/N |
|---|---|---|---|---|
| 1 | CH3(CH3O)2—Si—C3H6—NH—C2H4—NH2 & CH3(CH3O)2—Si—C3H6—NH—C2H4—NH—C3H6—Si—(OCH3)2CH3; qty- 38 gm & 4 gm, both took in 1st stage | 1st stage = D4/ 682 gm & 2nd stage = trimethylsiloxy terminated PDMS(20 cps) 20 | 1st stage 2.7 gm & 2nd stage 10 gm | Y/KOH 0.9 gm |
| 2 | CH3(CH3O)2—Si—C3H6—NH—C2H4—NH2 & CH3(CH3O)2—Si—C3H6—NH—C2H4—NH—C3H6—Si—(OCH3)2CH3; qty- 380 gm & 40 gm; both took in 1st stage | 1st stage = D4/650 gm & 2nd stage = trimethylsiloxy terminated PDMS (10 cps) 337 gm | 1st stage 0 gm & 2nd stage 102 gm | Y/KOH 0.9 gm in 2.7 gm ethanol |
| 3 | CH3(CH3O)2—Si—C3H6—NH—C2H4—NH2, qty-250 gm | D4, qty-1000 gm | 46 gm | N |
| 4 | CH3(C2H5O)2—Si—C3H6—NH2, qty-250 gm | D4, qty-1000 gm | 50 gm | N |
| 5 | CH3(CH3O)2—Si—C3H6—NH—C2H4—NH2, qty-500 gm | D4, qty-1000 gm | 92 gm | N |
| 6 | CH3(C2H5O)2—Si—C3H6—NH2, qty-500 gm | D4, qty-1000 gm | 100 gm | N |

| Exples | Reaction condn | Alcohol qty | % of alcohol recovered | Amine no of reaction product | Remark |
|---|---|---|---|---|---|
| 1 | 1st stage reaction = 140-150° C. for 6 hr & 2nd stage reaction = 4 hr | 4.8 | 36.4 | Amine no- 0.27 | experiment carried out as per example 1 in pat no U.S. Pat. No. 6,093,841A & low alcohol recovery means high amount —OCH3 at α, ω position turns unstable polymer viscosity due to inter & intermolecular condensation |
| 2 | 1st stage reaction = 140-150° C. for 4 hr & 2nd stage reaction = 4 hr | 63 | 47.7 | Amine no- 3.1 | experiment carried out as per example 2 in pat no U.S. Pat. No. 6,093,841A & low alcohol recovery means high amount —OCH3 at α, ω position turns unstable polymer viscosity due to inter & intermolecular condensation |
| 3 | water added at 70° C. for 4 hr & then hydrolysis carried out 90° C. till alcohols came | 76 | 97.81 | Amine no- 1.96 | here, no polymerization was carried out. Only hydrolysis amino oligomer dispersed in D4, Approx 98% alcohol recovered means amino oligomer free from —OCH3 |

TABLE 1-continued

| | | Hydrolysis of Silane | | | | |
|---|---|---|---|---|---|---|
| | 4 | water added at 70° C. for 4 hr & then hydrolysis carried out 90° C. till alcohols came | 118 | 98.01 | Amine no-0.95 | here, no polymerization was carried out. Only hydrolysed amino oligomer dispersed in D4. Approx 98% alcohol recovered means amino oligomer free from —OC2H5 |
| | 5 | water added at 70° C. for 4 hr & then hydrolysis carried out 90° C. till alcohols came | 69 | 44.40 | Amine no-1.91 | here, no polymerization was carried out. high amount of hydrolysed amino oligomer in D4 was not uniformly dispersed in D4. Approx 44.4% alcohol recovered means amino oligomer contained high amount of —OCH3 in α, ω position |
| | 6 | water added at 70° C. for 4 hr & then hydrolysis carried out 90° C. till alcohols came | 102 | 42.36 | Amine no-0.93 | here, no polymerization was carried out. high amount of hydrolysed amino oligomer in D4 was not uniformly dispersed in D4. Approx 42.36% alcohol recovered means amino oligomer contained high amount of —OC2H5 in α, ω position |

TABLE 2

| | | Amino Fluid Synthesis | | | | |
|---|---|---|---|---|---|---|
| Exples | Amino oligomer/ amino polymer | Siloxane | Cat | Reaction condn | Neutralization | Amine no |
| 7 | Amino fluid from exp-1 as per synthesized pat no U.S. Pat. No. 6,093,841A; qty-529 | OH terminated 80 cps PDMD oligomer, qty = 4016 gm | 1 gm 40% alcoholic KOH | 140 C. for 6 hr | Neutralized with silyl phosphate & distilled at 180 C. under vacuum | 0.035 |
| 8 | Amino fluid from exp-2 as per synthesized pat no U.S. Pat. No. 6,093,841A; qty-46 | OH terminated 80 cps PDMD oligomer, qty PDMS = 4425 gm & Trimethylsiloxy terminated PDMD (10 cps) = 85 gm | 1 gm 40% alcoholic KOH | 140 C. for 6 hr | Neutralized with silyl phosphate & distilled at 180 C. under vacuum | 0.033 |
| 9 | Amino hydrolyzate from Example-3, qty-72 gm | OH terminated 80 cps PDMD oligomer, qty PDMS = 4389 gm & Trimethylsiloxy terminated PDMD (10 cps) = 85 gm | 1 gm 40% alcoholic KOH | 140 C. for 6 hr | Neutralized with silyl phosphate & distilled at 180 C. under vacuum | 0.034 |
| 10 | Amino hydrolyzate from Example-4, qty-147 gm | OH terminated 80 cps PDMD oligomer, qty PDMS = 4313 gm & Trimethylsiloxy terminated PDMD (10 cps) = 85 gm | 1 gm 40% alcoholic KOH | 140 C. for 6 hr | Neutralized with silyl phosphate & distilled at 180 C. under vacuum | 0.0355 |
| 11 | Amino hydrolyzate from Example-5, qty-72 gm | OH terminated 80 cps PDMD oligomer, qty PDMS = 4387 gm & Trimethylsiloxy terminated PDMD (10 cps) = 85 gm | 1 gm 40% alcoholic KOH | 140 C. for 6 hr | Neutralized with silyl phosphate & distilled at 180 C. under vacuum | 0.036 |
| 12 | Amino hydrolyzate from Example-6, qty-151 gm | OH terminated 80 cps PDMD oligomer, qty PDMS = 4310 gm & Trimethylsiloxy terminated PDMD (10 cps) = 85 gm | 1 gm 40% alcoholic KOH | 140 C. for 6 hr | Neutralized with silyl phosphate & distilled at 180 C. under vacuum | 0.0345 |
| 13 | Amino hydrolyzate from Example-3, qty-72 gm | OH terminated 80 cps PDMD oligomer, qty PDMS = 4439 gm & Trimethylsiloxy terminated PDMD (10 cps) = 35 gm | 1 gm 40% alcoholic KOH | 140 C. for 6 hr | Neutralized with silyl phosphate & distilled at 180 C. under vacuum | 0.0335 |
| 14 | Amino hydrolyzate from Example-4, qty-147 gm | OH terminated 80 cps PDMD oligomer, qty PDMS = 4363 gm & Trimethylsiloxy terminated PDMD (10 cps) = 35 gm | 1 gm 40% alcoholic KOH | 140 C. for 6 hr | Neutralized with silyl phosphate & distilled at 180 C. under vacuum | 0.0361 |
| 15 | CH3(CH3O)2—Si—C3H6—NH—C2H4—NH2, qty-59 gm | OH terminated 80 cps PDMD oligomer, qty PDMS = 4387 gm & Trimethylsiloxy terminated PDMD (10 cps) = 100 gm | 1 gm 40% alcoholic KOH | 140 C. for 6 hr | Neutralized with silyl phosphate & distilled at 180 C. under vacuum | 0.12 |

TABLE 2-continued

Amino Fluid Synthesis

| Exples | Polymer viscosity after distillation | Polymer viscosity after 15 days at ambient | Polymer viscosity after 15 days at 55° C. | Remark |
|---|---|---|---|---|
| 7 | 200000 Cps at 25 C. | 800000 cps and gelling nature | gelled | when polymer made as per exp 1 in pat no U.S. Pat. No. 6,093,841A used to make high viscous amino silicone fluid, synthesized polymer become gelled after some times due to high alcoxy gr present and crosslinked on storage due to inter and intra molecular condensation |
| 8 | 190000 Cps at 25 C. | 800000 cps and gelling nature | gelled | when polymer made as per exp 1 in pat no U.S. Pat. No. 6,093,841A used to make high viscous amino silicone fluid, synthesized polymer become gelled after some times due to high alcoxy gr present and crosslinked on storage due to inter and intra molecular condensation |
| 9 | 210000 Cps at 25 C. | 215000 Cps at 25 C. | 225000 Cps at 25 C. | here, synthesized polymer showed highly stable in viscosity due to less reacting gr (—OCH3) and no crosslink took place on storage due to inter and intra molecular condensation |
| 10 | 215000 Cps at 25 C. | 225000 Cps at 25 C. | 235000 Cps at 25 C. | here, synthesized polymer showed highly stable in viscosity due to less reacting gr (—OCH3) and no crosslink took place on storage due to inter and intra molecular condensation |
| 11 | 205000 Cps at 25 C. | 600000 Cps at 25 C. | gelled | here, synthesized polymer become gelled after some times due to high alcoxy gr present and crosslinked on storage due to inter and intra molecular condensation |
| 12 | 197000 Cps at 25 C. | 720000 Cps at 25 C. | gelled | here, synthesized polymer become gelled after some times due to high alcoxy gr present and crosslinked on storage due to inter and intra molecular condensation |
| 13 | 490000 Cps at 25 C. | 510000 Cps at 25 C. | 590000 Cps at 25 C. | here, synthesized polymer showed highly stable in viscosity due to less reacting gr (—OCH3) and no crosslink took place on storage due to inter and intra molecular condensation |
| 14 | 510000 Cps at 25 C. | 520000 Cps at 25 C. | 586000 Cps at 25 C. | here, synthesized polymer showed highly stable in viscosity due to less reacting gr (—OCH3) and no crosslink took place on storage due to inter and intra molecular condensation |
| 15 | 5000 Cps at 25 C. | 5500 Cps at 25 C. | 7000 Cps at 25 C. | low viscous amino fluid stable even with highly content of —OCH3 |

TABLE 3

Preparation of emulsions of amino silicone

| Expls | Fluid | Emulsifiers, additive & biocid | HLB | % of Emulsifier | water | M/c |
|---|---|---|---|---|---|---|
| 16 | Exp Amino silicone fluid 9 = 30% | Isotridecyl alcohol ethoxylated, 6EO = 7.7%; Isotridecyl alcohol ethoxylated, 3EO = 1.9%, cetostrearyl alcohol, 20EO = 1.3%, 0.18% ppm AcOH & 12 ppm MIT & CMIT | 10.9 | 11.2 | 57.3% | turrax |
| 17 | Exp Amino silicone fluid 9 = 30% | Isotridecyl alcohol ethoxylated, 6EO = 7.2%; Isotridecyl alcohol ethoxylated, 3EO = 2.6%, cetostrearyl alcohol, 20EO = 1%, 600 ppm AcOH & 12 ppm MIT & CMIT | 11 | 10.8 | 59.1% | turrax |
| 18 | Exp Amino silicone fluid 9 = 58% | Isotridecyl alcohol ethoxylated 10EO = 3.1%, Isotridecyl alcohol ethoxylated 5EO = 0.4; Acrylamiclopropyltrimonium Chloride/Acrylamide Copolymer = 0.2%; 0.18% AcOH & 12 ppm MIT & CMIT | 13.8 | 3.5 | 38.1% | Viscojet |
| 19 | Exp Amino silicone fluid 9 = 58% | Isotridecyl alcohol ethoxylated 10EO = 3.2%, Stearyl alcohol 6EO = 0.2%; Acrylamidopropyltrimonium Chloride/Acrylamide Copolymer = 0.7%; 0.18% AcOH & 12 ppm MIT & CMIT | 13.5 | 3.5 | 37.6% | Viscojet |

TABLE 3-continued

Preparation of emulsions of amino silicone

| | | | | | | |
|---|---|---|---|---|---|---|
| 20 | Exp Amino silicone fluid 9 = 50% | Isotridecyl alcohol ethoxylated 3EO = 0.4%, Stearyl alcohol 6EO = 1.7, Acrylamidopropyltrimonium Chloride/Acrylamide Copolymer = 0.4%; 0.15% AcOH & 12 ppm MIT & CMIT | 9.5 | 2.1 | 47.4% | Viscojet |
| 21 | Exp Amino silicone fluid14 = 30% | Isotridecyl alcohol ethoxylated, 6EO = 7.4%; Isotridecyl alcohol ethoxylated, 3EO = 2.7%, cetostrearyl alcohol, 20EO = 0.9%, 0.18% ppm AcOH & 12 ppm MIT & CMIT | 11 | 10.9 | 58.8% | turrax |
| 22 | Exp Amino silicone fluid 15 = 30% | Isotridecyl alcohol ethoxylated, 6EO = 7.7%; Isotridecyl alcohol ethoxylated, 3EO = 1.9%, cetostrearyl alcohol, 20EO = 1.3%, 0.18% ppm AcOH & 12 ppm MIT & CMIT | 10.9 | 11.2 | 57.3% | turrax |

| Expls | Process | Emul D50 | Stability, 55° C., 30 days |
|---|---|---|---|
| 16 | mixed all emulsifiers & amino fluid with turrax for 5 min. Added AcOH &15% of total water and mixed for 1 hr. Added (4 + 4 + 11 + 17 + 49)% of total water and mixed 15 min after each addition of water. Added AcOH and mixed for 5 min. Finally added biocid and mixed for 5 min | 60 nm | no separation |
| 17 | mixed all emulsifiers & amino fluid with turrax for 5 min. Added 13% of total water and mixed for 1 hr. Added (4 + 4 + 11 + 19 + 49)% of total water and mixed 15 min after each addition of water. Added AcOH and mixed for 5 min. Finally added biocid and mixed for 5 min | 180 nm | no separation |
| 18 | mixed all emulsifiers & amino fluid with viscojet for 5 min. Added AcOH and 54% of total water and mixed for 1 hr. Added rest water and mixed 30 min. Finally added biocid and mixed for 5 min | 3 000 nm | no separation |
| 19 | mixed Isotridecyl alcohol ethoxylate & amino fluid with viscojet for 5 min. Added AcOH and 59% of total water and mixed for 1 hr. Added rest water with cationic polymer and mixed 30 min. Finally added biocid and mixed for 5 min | 11800 nm | no separation |
| 20 | mixed all emulsifiers & amino fluid with turrax for 5 min. Added AcOH and 57% of total water and mixed for 1 hr. Added rest water and mixed 30 min. Finally added biocid and mixed for 5 min | 27000 nm | no separation |
| 21 | mixed all emulsifiers & amino fluid with turrax for 5 min. Added AcOH &15% of total water and mixed for 1 hr. Added (3 + 4 + 11 + 17 + 49)% of total water and mixed 15 min after each addition of water. Added AcOH and mixed for 5 min. Finally added biocid and mixed for 5 min | 74 nm | no separation |
| 22 | mixed all emulsifiers & amino fluid with turrax for 5 min. Added AcOH &15% of total water and mixed for 1 hr. Added (4 + 4 + 11 + 17 + 49)% of total water and mixed 15 min after each addition of water. Added AcOH and mixed for 5 min. Finally added biocid and mixed for 5 min | 22 nm | no separation |

TABLE 4

Preparation of emulsions of amino silicone

| Expls | Fluid | Emulsifiers, additive & biocid | HLB | % of Emulsifier | water | M/c |
|---|---|---|---|---|---|---|
| 23 | Exp Amino silicone fluid 9 = 30% | Isotridecyl alcohol ethoxylated, 5EO = 13.8%; 0.18% AcOH & 12 ppm MIT & CMIT | 10.5 | 13.8 | 56.0% | turrax |

TABLE 4-continued

Preparation of emulsions of amino silicone

| | | | | | | |
|---|---|---|---|---|---|---|
| 24 | Exp Amino silicone fluid 9 = 30% | Isotridecyl alcohol ethoxylated, 10EO = 6.0%; 600 ppm AcOH & 12 ppm MIT & CMIT | 13.8 | 6 | 64.0% | turrax |
| 25 | Exp Amino silicone fluid 14 = 58% | Isotridecyl alcohol ethoxylated 5EO = 2.4%, Acrylamidopropyltrimonium Chloride/Acrylamide Copolymer = 0.2%; 0.18% AcOH & 12 ppm MIT & CMIT | 10.5 | 12 | 30.0% | Viscojet |
| 26 | Exp Amino silicone fluid14 = 58% | Isotridecyl alcohol ethoxylated 10EO = 3.5%, Acrylamidopropyltrimonium Chloride/Acrylamide Copolymer = 0.7%; 0.18% AcOH & 12 ppm MIT & CMIT | 13.8 | 6 | 35.1% | Viscojet |
| 27 | Exp Amino silicone fluid 9 = 50% | Isotridecyl alcohol ethoxylated10EO = 1.5%, Acrylamidopropyltrimonium Chloride/Acrylamide Copolymer = 0.4%; 0.15% AcOH & 12 ppm MIT & CMIT | 9.5 | 2.1 | 48.0% | Viscojet |
| 28 | Exp Amino silicone fluid 9 = 50% | Isotridecyl alcohol ethoxylated 3EO = 1.5%, Acrylamidopropyltrimonium Chloride/Acrylamide Copolymer = 0.4%; 0.15% AcOH & 12 ppm MIT & CMIT | 8 | 3.5 | 46.0% | Viscojet |
| 29 | Exp Amino silicone fluid 14 = 50% | Isotridecyl alcohol ethoxylated10EO = 1.5%, Acrylamidopropyltrimonium Chloride/Acrylamide Copolymer = 0.4%; 0.15% AcOH & 12 ppm MIT & CMIT | 9.5 | 2.1 | 48.0% | Viscojet |
| 30 | Exp Amino silicone fluid 14 = 50% | Isotridecyl alcohol ethoxylated 3EO = 1.5%, Acrylamidopropyltrimonium Chloride/Acrylamide Copolymer = 0.4%; 0.15% AcOH & 12 ppm MIT & CMIT | 8 | 3.5 | 46.0% | Viscojet |

| Expls | Process | Emul D50 | Stability, 55° C., 30 days |
|---|---|---|---|
| 23 | mixed all emulsifiers & amino fluid with turrax for 5 min. Added AcOH &15% of total water and mixed for 1 hr. Added (4 + 4 + 11 + 17 + 49)% of total water and mixed 15 min after each addition of water. Added AcOH and mixed for 5 min. Finally added biocid and mixed for 5 min | 420 nm | separated |
| 24 | mixed all emulsifiers & amino fluid with turrax for 5 min. Added 13% of total water and mixed for 1 hr. Added (4 + 4 + 11 + 19 + 49)% of total water and mixed 15 min after each addition of water. Added AcOH and mixed for 5 min. Finally added biocid and mixed for 5 min | 550 nm | separated |
| 25 | mixed all emulsifiers & amino fluid with viscojet for 5 min. Added AcOH and 54% of total water and mixed for 1 hr. Added rest water and mixed 30 min. Finally added biocid and mixed for 5 min | 7 000 nm | separated |
| 26 | mixed Isotridecyl alcohol ethoxylate & amino fluid with viscojet for 5 min. Added AcOH and 59% of total water and mixed for 1 hr. Added rest water with cationic polymer and mixed 30 min. Finally added biocid and mixed for 5 min | 16000 nm | separated |
| 27 | mixed all emulsifiers & amino fluid with turrax for 5 min. Added AcOH and 57% of total water and mixed for 1 hr. Added rest water and mixed 30 min. Finally added biocid and mixed for 5 min | 30000 nm | separated |
| 28 | mixed all emulsifiers & amino fluid with turrax for 5 min. Added AcOH and 57% of total water and mixed for 1 hr. Added rest water and mixed 30 min. Finally added biocid and mixed for 5 min | 32000 nm | separated |
| 29 | mixed all emulsifiers & amino fluid with turrax for 5 min. Added AcOH and 57% of total water and mixed for 1 hr. Added rest water and mixed 30 min. Finally added biocid and mixed for 5 min | 18000 nm | separated |

TABLE 4-continued

Preparation of emulsions of amino silicone

| | | |
|---|---|---|
| 30 | mixed all emulsifiers & amino fluid with turrax for 5 min. Added AcOH and 57% of total water and mixed for 1 hr. Added rest water and mixed 30 min. Finally added biocid and mixed for 5 min | 29000 nm separated |

TABLE 5

Shampoo Base Composition

| Serial No | Ingredients | Quantity(wt %) |
|---|---|---|
| a | Demineralised water | 25.47 |
| | * 4% anionic thickening agent | 10.34 |
| b | Sodium Lauryl ether sulphate (30% active) | 41.48 |
| | Cocoamidopropyl betaine | 4.79 |
| c | Ethylene glycol mono stearate | 0.98 |
| | PEG - 45 | 0.025 |
| d | depositing agent | 0.2 |
| | Glycerine | 0.98 |
| e | 50% Sodium hydroxide solution | 0.049 |
| | Demineralised water | 2.09 |
| f | Cosmetic grade mica | 0.147 |
| g | 50% Sodium hydroxide solution | 0.31 |
| | Demineralised water | 0.31 |
| | DMDM Hydantoin | 0.098 |
| h | Kathon CG | 0.021 |
| | Disodium EDTA | 0.049 |
| i | Perfume | 0.049 |
| j | 15% Sodium chloride solution | 8.71 |

* Made 0.1% glydant stock solution in demineralised water. Then make 4% carbomer slurry in the stock solution.

Procedure:
1 Mixed ingredients a at 45° C. for 30 mins
2 Mixed ingredients b at 45° C. for 30 mins
3 Mixed ingredients c at 45° C. for 60 mins
4 Mixed ingredients d at 45° C. for 45 mins
5 Mixed ingredients e at 45° C. for 30 mins
6 Mixed ingredients f at 45° C. for 60 mins
7 Mixed ingredients g at 45° C. for 30 mins
8 Mixed ingredients h at 45° C. for 30 mins
9 Cooled the above mixture to room temperature and add perfume.
10 Added sodium chloride solution and stir for 15 mins Shampoo A contained Guar Hydroxylpropyl trimonium chloride as depositing agent
Shampoo B contained Polyquaternium 10 as depositing agent
Shampoo C contained Polyquaternium 7 as depositing agent

TABLE 6

Shampoo Compositions

| Shampoo Name | Base composition | Silicone emulsion | % Silicone emulsion (active) | Sampoo vis, cps, 25° C. |
|---|---|---|---|---|
| ShmpA17 | Shampoo A | Examp -17 | 5 | 8000 |
| ShmpA18 | Shampoo A | Examp -18 | 2.6 | 7900 |
| ShmpA20 | Shampoo A | Examp -20 | 3 | 8400 |
| ShmpA21 | Shampoo A | Examp -21 | 5 | 7600 |
| ShmpA22 | Shampoo A | Examp -22 | 5 | 2000 |
| ShmpB17 | Shampoo B | Examp -17 | 5 | 8100 |
| ShmpB18 | Shampoo B | Examp -18 | 2.6 | 7900 |
| ShmpB20 | Shampoo B | Examp -20 | 3 | 8400 |
| ShmpB21 | Shampoo B | Examp -21 | 5 | 7600 |
| ShmpB22 | Shampoo B | Examp -22 | 5 | 2000 |
| ShmpC17 | Shampoo C | Examp -17 | 5 | 8000 |
| ShmpC18 | Shampoo C | Examp -18 | 2.6 | 7900 |
| ShmpC20 | Shampoo C | Examp -20 | 3 | 8400 |
| ShmpC21 | Shampoo C | Examp -21 | 5 | 7600 |
| ShmpC22 | Shampoo C | Examp -22 | 5 | 2000 |

TABLE 7

Heat Stability of Shampoos

| | Heat stability at 45° C. | | | | | | | |
|---|---|---|---|---|---|---|---|---|
| Date | ShmpA17 | ShmpA18 | ShmpA20 | ShmpA21 | ShmpA22 | ShmpB17 | ShmpB18 | ShmpB20 |
| After 1 day | 8000 | 7900 | 8400 | 7600 | 2000 | 8100 | 7900 | 8400 |
| After 7 days | 7900 | 7900 | 8200 | 7500 | 1500 | 7900 | 7900 | 8200 |
| After 14 days | 7900 | 7800 | 8200 | 7500 | 1100 | 7800 | 7800 | 8200 |
| After 21 days | 7800 | 7800 | 8100 | 7300 | 900 | 7800 | 7700 | 8100 |
| After 28 days | 7400 | 7600 | 7800 | 7300 | 500 | 7500 | 7600 | 7900 |
| After 35 days | 7400 | 7600 | 7800 | 7200 | 200 | 7500 | 7500 | 7900 |
| After 42 days | 7400 | 7600 | 7800 | 7200 | 200 | 7500 | 7500 | 7900 |
| After 49 days | 7400 | 7500 | 7700 | 7200 | 100 | 7400 | 7500 | 7600 |
| After 56 days | 7400 | 7500 | 7700 | 7200 | 100 | 7400 | 7500 | 7600 |
| After 63 days | 7400 | 7500 | 7700 | 7200 | 100 | 7400 | 7500 | 7600 |
| After 70 days | 7200 | 7200 | 7500 | 7200 | 100 | 7200 | 7000 | 7400 |
| After 77 days | 7200 | 7200 | 7500 | 7200 | 100 | 7200 | 7000 | 7400 |
| After 84 days | 7000 | 7100 | 7400 | 7000 | 100 | 7000 | 7000 | 7200 |
| After 91 days | 7000 | 7000 | 7400 | 7000 | 100 | 7000 | 7000 | 7100 |

TABLE 7-continued

Heat Stability of Shampoos

Heat stability at 45° C.

| Date | ShmpB21 | ShmpB22 | ShmpC17 | ShmpC18 | ShmpC20 | ShmpC21 | ShmpC22 |
|---|---|---|---|---|---|---|---|
| After 1 day | 7600 | 2000 | 8000 | 7900 | 8400 | 7600 | 2000 |
| After 7 days | 7500 | 1500 | 7900 | 7900 | 8300 | 7500 | 1500 |
| After 14 days | 7500 | 1000 | 7900 | 7700 | 8200 | 7500 | 1100 |
| After 21 days | 7400 | 800 | 7800 | 7800 | 8200 | 7400 | 800 |
| After 28 days | 7300 | 400 | 7400 | 7700 | 7900 | 7300 | 400 |
| After 35 days | 7300 | 200 | 7400 | 7600 | 7900 | 7300 | 200 |
| After 42 days | 7300 | 200 | 7400 | 7600 | 7900 | 7300 | 200 |
| After 49 days | 7200 | 100 | 7400 | 7400 | 7700 | 7200 | 100 |
| After 56 days | 7200 | 100 | 7400 | 7400 | 7700 | 7200 | 100 |
| After 63 days | 7200 | 100 | 7400 | 7400 | 7700 | 7200 | 100 |
| After 70 days | 7200 | 100 | 7200 | 7200 | 7400 | 7200 | 100 |
| After 77 days | 7200 | 100 | 7200 | 7200 | 7400 | 7200 | 100 |
| After 84 days | 7000 | 100 | 7000 | 7000 | 7200 | 7200 | 100 |
| After 91 days | 7000 | 100 | 7000 | 7000 | 7100 | 7200 | 100 |

TABLE 8

Sensory Evaluation of Shampoo's by Machine

| Attributes | #Control | ShmpA17 | ShmpA18 | ShmpA20 | ShmpA21 | ShmpA22 | ShmpB17 | ShmpB18 |
|---|---|---|---|---|---|---|---|---|
| Change %, Wet combing force | 70 | 85 | 79 | 78 | 82 | 68 | 86 | 80 |
| Change %, Wet surface smoothness | 7.8 | 22 | 15 | 20 | 27 | 9.3 | 31 | 29 |
| Change %, Dry combing force | 55 | 86 | 80 | 81 | 86 | 75 | 88 | 85 |
| Change %, Dry surface smoothness | 3.2 | 35 | 27 | 30 | 39 | 16 | 42 | 34 |
| Gloss on wet hair | + | ++ | ++ | ++ | ++ | + | ++ | ++ |
| Gloss on dry hair | + | ++ | ++ | ++ | ++ | + | ++ | ++ |
| Foam height, mm | 700 | 790 | 790 | 770 | 760 | 790 | 780 | 770 |

| Attributes | ShmpB20 | ShmpB21 | ShmpB22 | ShmpC17 | ShmpC18 | ShmpC20 | ShmpC21 | ShmpC22 |
|---|---|---|---|---|---|---|---|---|
| Change %, Wet combing force | 78 | 80 | 60 | 90 | 84 | 78 | 85 | 70 |
| Change %, Wet surface smoothness | 19 | 26 | 8.5 | 56 | 29 | 27 | 41 | 7.7 |
| Change %, Dry combing force | 82 | 86 | 71 | 95 | 90 | 84 | 89 | 79 |
| Change %, Dry surface smoothness | 29 | 39 | 14 | 65 | 41 | 38 | 50 | 18.2 |
| Gloss on wet hair | ++ | ++ | + | +++ | ++ | ++ | ++ | + |
| Gloss on dry hair | ++ | ++ | + | +++ | ++ | ++ | ++ | + |
| Foam height, mm | 760 | 760 | 790 | 800 | 780 | 780 | 760 | 790 |

Control shampoo composition - Shampoo base A with 1.5% active Wacker Belsil 3140E (50% active one million cps dimethiconol oil anionic EP emulsion)

TABLE 9

Silicone Deposition on hair

| Attributes | #Control | ShmpA17 | ShmpA18 | ShmpA20 | ShmpA21 | ShmpA22 | ShmpB17 | ShmpB18 |
|---|---|---|---|---|---|---|---|---|
| Deposition % on normal hair | 12 | 33 | 29 | 32 | 33 | 17 | 29 | 23 |
| Deposition % on damaged hair | 25 | 48 | 45 | 50 | 52 | 25 | 56 | 47 |

| Attributes | ShmpB20 | ShmpB21 | ShmpB22 | ShmpC17 | ShmpC18 | ShmpC20 | ShmpC21 | ShmpC22 |
|---|---|---|---|---|---|---|---|---|
| Deposition % on normal hair | 27 | 25 | 15 | 22 | 25 | 17 | 23 | 19 |
| Deposition % on damaged hair | 53 | 55 | 24 | 67 | 52 | 58 | 50 | 27 |

Control shampoo composition - Shampoo base A with 1.5% active Wacker Belsil 3140E

TABLE 10

SHAMPOO EVALUATION IN SALON

| Attributes | #Control | ShmpA17 | Control | ShmpA18 | Control | ShmpA20 | Control | ShmpA21 | Control | ShmpA22 |
|---|---|---|---|---|---|---|---|---|---|---|
| Viscosity | 8500 | 8000 | 8500 | 7900 | 8500 | 8400 | 8500 | 7600 | 8500 | 2000 |
| Foam | 6 | 8 | 7 | 7 | 7 | 7 | 7 | 7 | 6 | 8 |
| Wet Combing | 4 | 10 | 4 | 10 | 5 | 9 | 4 | 10 | 6 | 6 |

TABLE 10-continued

| | | | | | | | | | | |
|---|---|---|---|---|---|---|---|---|---|---|
| Dry Combing | 6 | 8 | 6 | 8 | 6 | 8 | 6 | 8 | 8 | 6 |
| Softness | 7 | 7 | 7 | 7 | 7 | 7 | 7 | 7 | 5 | 9 |
| Volume | 6 | 5 | 6 | 5 | 6 | 5 | 6 | 5 | 6 | 3 |
| Silkyness | 6 | 8 | 5 | 9 | 6 | 8 | 5 | 9 | 6 | 8 |
| Shine after washing | 3 | 11 | 4 | 11 | 4 | 10 | 4 | 11 | 5 | 7 |
| Shine after 24 | 3 | 11 | 5 | 9 | 3 | 11 | 5 | 9 | 5 | 6 |
| Wet Softness | 2 | 12 | 5 | 9 | 5 | 9 | 5 | 9 | 5 | 8 |
| Cleaning | 6 | 5 | 6 | 5 | 6 | 5 | 6 | 5 | 6 | 5 |

| Attributes | Control | ShmpB17 | Control | ShmpB18 | Control | ShmpB20 |
|---|---|---|---|---|---|---|
| Viscosity | 8500 | 8100 | 8500 | 7900 | 8500 | 8400 |
| Foam | 7 | 7 | 6 | 8 | 6 | 8 |
| Wet Combing | 3 | 11 | 3 | 10 | 5 | 9 |
| Dry Combing | 5 | 9 | 5 | 9 | 5 | 8 |
| Softness | 6 | 8 | 6 | 8 | 4 | 8 |
| Volume | 6 | 5 | 6 | 5 | 6 | 5 |
| Silkyness | 5 | 9 | 5 | 9 | 4 | 8 |
| Shine after washing | 2 | 12 | 3 | 11 | 3 | 10 |
| Shine after 24 | 3 | 11 | 5 | 9 | 3 | 11 |
| Wet Softness | 2 | 12 | 5 | 9 | 5 | 9 |
| Cleaning | 6 | 5 | 6 | 5 | 6 | 5 |

| Attributes | Control | ShmpB21 | Control | ShmpB22 | Control | ShmpC17 | Control | ShmpC18 | Control | ShmpC20 |
|---|---|---|---|---|---|---|---|---|---|---|
| Viscosity | 8500 | 7600 | 8500 | 2000 | 8500 | 8000 | 8500 | 7900 | 8500 | 8400 |
| Foam 7 | 7 | 7 | 7 | 7 | 5 | 9 | 7 | 7 | 6 | 8 |
| Wet Combing | 3 | 11 | 6 | 5 | 2 | 12 | 4 | 10 | 3 | 10 |
| Dry Combing | 6 | 8 | 7 | 7 | 5 | 9 | 6 | 8 | 5 | 9 |
| Softness | 7 | 7 | 5 | 9 | 4 | 10 | 4 | 10 | 4 | 10 |
| Volume | 6 | 5 | 6 | 3 | 6 | 5 | 7 | 5 | 6 | 6 |
| Silkyness | 4 | 9 | 6 | 8 | 3 | 11 | 5 | 9 | 5 | 9 |
| Shine after washing | 3 | 11 | 6 | 7 | 2 | 12 | 3 | 11 | 4 | 11 |
| Shine after 24 | 2 | 12 | 6 | 6 | 2 | 12 | 4 | 10 | 5 | 9 |
| Wet Softness | 3 | 11 | 5 | 8 | 2 | 12 | 4 | 10 | 4 | 10 |
| Cleaning | 6 | 6 | 6 | 5 | 6 | 7 | 5 | 6 | 4 | 6 |

| Attributes | Control | ShmpC21 | Control | ShmpC22 |
|---|---|---|---|---|
| Viscosity | 8500 | 7600 | 8500 | 2000 |
| Foam 7 | 7 | 7 | 7 | 7 |
| Wet Combing | 3 | 11 | 5 | 2 |
| Dry Combing | 4 | 6 | 6 | 5 |
| Softness | 4 | 10 | 9 | 4 |

TABLE 10-continued

| | | | | | |
|---|---|---|---|---|---|
| | Volume | 5 | 4 | 3 | 6 |
| | Silkyness | 4 | 10 | 8 | 3 |
| | Shine after washing | 3 | 11 | 7 | 2 |
| | Shine after 24 | 3 | 11 | 6 | 2 |
| | Wet Softness | 3 | 11 | 8 | 2 |
| | Cleaning | 6 | 6 | 5 | 6 |

Control shampoo composition—Shampoo Base A with 1.5% active Wacker Belsil 3140E (50% activeone million cps dimethiconol oil anionic EP emulsion)

Confidence 90%

Confidence 95%

Confidence 99%

In Table 1, and examples 1 & 2 therein were carried out according to the process mentioned in U.S. Pat. No. 6,093,841A wherein after hydrolysis, only 35-45% alcohol recovered meaning hydrolysed silane still contained 55-65% alcoxy group. As a result, the polymers illustrated under examples 7 and 8 of Table 2 prepared by using the silane of example 1 & 2 gets gelled due to high alcoxy group content in the silane which afterward gets cross linked by intra or inter molecular condensation or hydrogen bonding with the amine group.

Hydrolysis of silane carried out by way of the present invention, illustrated in Table 1, under examples 3 & 4 showed 98% alcohol recovery meaning the hydrolysed silane was almost free from alcoxy groups. Therefore, the amino fluids made out of the said hydrolysed silane under examples 3 & 4 and illustrated under examples 9, 10, 13 & 14 in Table 2, reflected no gellation even after heat ageing at 55° C.

Again, the high concentration of amino silane in the solvent as per examples 5 & 6 in Table 1 were unable to split alcoxy groups from amino silanes that resulted in low amount alcohol recovery. As a result, when amino fluids were made by using hydrolyzed silane as per example 5 & 6 and as illustrated in examples 11 & 12 in table 2, it gets gelled due to high alcoxy group content in the silane which afterward gets cross linked by intra or inter molecular condensation or hydrogen bonding with amine group. Therefore, from table 1 & 2, it is clear that a stable high viscous amino fluid is made possible if silane used for making such amino fluid is free from alcoxy groups.

In Table 3, emulsions made by using hydrolysed silane from examples 3 & 4 of Table 1 leading to amino fluids 9 and 14 of Table 2 along with emulsifiers with HLB values 8-15 with a desired combination of fluid and emulsifiers according to present invention are found to be stable at different particles sizes, as illustrated in examples 16 to 21.

Again, in table 4, emulsions made by using hydrolysed silane from examples 3 & 4 of Table 1 leading to amino fluids 9 and 14 of Table 2 along with emulsifiers with HLB values 8-15 with a different combination of fluid and emulsifies were found unstable at different particles sizes, showed in examples 23 to 30. Therefore, from Table 3 & 4, it is understood that a stable high viscous amino fluid is only possible if a right combination of mixed emulsifiers with or without cationic emulsifier is used together with the high viscous amino silicone fluid.

Importantly in Table 3, emulsion 21 is utilized for studying the performance of standard amino silicone fluid emulsion with highly viscous amino fluid emulsions made according to the present invention.

For the study of high viscous amino silicone emulsion performance in 2-in-1 type shampoo, a base as illustrated in Table 5 is prepared. Shampoo base was categorized as shampoo A, B & C according to different depositing agents. 15 different shampoo formulations with additional one control shampoo were prepared for studying the performance of high viscous amino emulsions made by way of the present invention. 15 different shampoo formulations were studied according to compositions illustrated in Table 6.

Viscosity stability of the shampoos at 45° C. is shown in Table 7. All shampoos made as per Table 6 were kept at 45° C. for 3 months and shampoo viscosity for formulations under Table 6 such as formulations ShampA17 to ShampA21 were observed against standard shampoo formulations ShmpA22, ShmpB22 & ShmpC22 containing emulsion of standard viscosity amino fluid of Example 22 under Table 3. The formulations ShmpA22, ShmpB22 & ShmpC22 showed drastical drop in shampoo viscosity whereas other shampoos containing high viscous amino silicone emulsions showed marginal drops in shampoo viscosity.

Shampoo viscosity is an important parameter for getting application of shampoo on hair. Basic problem of low viscosity shampoo on hair washing is to slip out during washing of hair and also an important parameter from consumer point of acceptability since consumer accept shampoo with certain thick consistency but consumers believe lower viscosity shampoo means some problem in the product. Generally minimum 4000 cps shampoo viscosity is required at the end of storage cycle and according to the present invention, all shampoo containing high viscosity amino emulsion remains well within the limit at the end of heat ageing cycle.

Tables 8 and 10, illustrate the conditioning properties of the shampoos with different type's high viscous amino silicone emulsions obtained by way of the present invention as compared with standard amino silicone emulsion and control silicone emulsion. From the analysis, it is clear that high viscous amino silicone emulsions having particle sizes below 300 nm showed excellent conditioning effects in-comparison to control formulation as mentioned below Table 8 and shampoo with standard amino silicone emulsion. It was also observed Shampoos containing high viscous amino emulsions with depositing agent Polyquart-7 was found to be comparatively better in conditioning effect in comparison to Shampoos containing high viscous amino emulsions with depositing agent Polyquart-10 and Guar Hydroxylpropyl trimonium chloride.

Table 9 illustrates silicone deposition of all shampoos on normal hair & damaged hair shown and observed silicone deposition on hair from shampoo containing high viscous amino silicone emulsion much higher compare to control shampoo and shampoo containing standard amino silicone emulsion. Moreover, shampoo containing high viscosity amino emulsion of the present invention always deposited higher amount of silicone on damaged hair meaning on hair tips and deposited less silicone on normal hair such as hair root. Most interestingly, shampoo C17 showed maximum deposition on damage hair and less in roots. It was also observed from table no 9 that same amino emulsion with polyquaternium 7 as the cationic depositing agent transferred optimum amount of siloxane in comparison to shampoo containing same amino emulsion with different depositing agent. These controlled depositing properties not only repair the damaged hair but also save hair fall due to less deposition of silicone at hair roots which helps a smooth secretion of sebum from roots cells. Moreover, this property not only saves the wastage of silicone during application in hair washing but also helps to optimize the best conditioning effect by using comparatively less dosage of high viscous amino silicone emulsion in the shampoo formulation making the said formulation an economical one.

Importantly, it is found by way of the invention that one of the critical aspects, which enable producing the stable linear high viscous amino silicone fluid is that the amine number of the fluid which has an important role to stabilize the fluid when polymer attains high viscosity. Type of catalyst, quantity of the catalyst also have important role to stabilize high viscosity amino fluid. Quantity of amino silane oligomer also controls the stability final viscosity, stability of the emulsion and emulsion performance in end use applications especially in personal care application and more importantly in hair care product without showing any negative sensory effect.

It is also found by way of invention that the same enables the production of an emulsion of highly viscous amino silicone polymer by a simple process due to selective use of emulsifiers. Also the quantity of the emulsifiers has great role to make the emulsion stable. In particular, in the above process of making different particles high viscous amino silicone emulsion is stabilized by use of surfactants having a critical HLB values that help to make faster desire particle size emulsion by using simple high shear mixer without need for complex a high capital shear mixer. It is also important to control temperature for achieving desire particle size with narrow distribution of the particle.

Moreover, the present invention further identifies the importance of the selective use of non-ionic emulsifier by way of a mixture of non-ionic and cationic emulsifiers having HLB value of the mixture in-between 5 to 19 shows optimum combinations to make stable different particle stable emulsion with a help of simple high shear mixer. Furthermore, in present invention cationic emulsifier may optimize performance in final application.

The invention claimed is:

1. A process for the synthesis of a amino silicone emulsion comprising (i) amino silicone polymeric fluid of viscosity of at least 50000 cps to upto 2 Mio cps at 25° C. with an amine number of up to 0.12 mg of KOH per gm of the polymer obtained of hydrolyzed amino silane solution having hydrolyzed amino silane oligomer free of alkoxy group in its alpha omega position, and free of any crosslinked silicone polymers or any other type of amino silane or siloxane and involving essentially linear propagation of the difunctional unit of the siloxane molecule, (ii) non-ionic and optionally (iii) cationic emulsifiers and said emulsion having a particle size of upto 150 micron
comprising the steps of:
i. providing amino silicone polymeric fluid with viscosity in the range of 50000 cps to 2 Mio cps comprising steps of (a) hydrolyzing amino silane of general formula

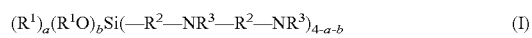

$(R^1)_a(R^1O)_b Si(-R^2-NR^3-R^2-NR^3)_{4-a-b}$ (I)

wherein 'b' is the integer of maximum 2 and 'a' maximum 2;
when 'b' is the integer of maximum 2, a=1 and when 'a' is the integer of maximum 2, b=1;
wherein $R^1$ is a monofunctional, saturated or unsaturated alkyl group with 1 to 20 carbon atoms or monofunctional aryl group with 6 to 20 carbon atoms;
wherein $R^2$ is the difunctional alkylene group with 1 to 10 carbon atoms or difunctional aryl group with 6 to 10 carbon atoms;
wherein $R^3$ is the hydrogen atom or atoms or saturated or unsaturated alkyl group with 1 to 20 carbon atoms or monofunctional aryl group with 6 to 20 carbon atoms;
to yield hydrolyzed amino silane solution having hydrolyzed amino silane oligomer free of alkoxy groups in its alpha omega position comprising the steps of: (I) dissolving the silane in an organic solvent in the concentration range of upto 20%; (II) adding water in a stoichiometric amount half mole of 'b' in the silane and in controlled amount in nitrogen atmosphere in a temperature range of 50-130° C. to split the alkoxy group completely from silane molecule; and (III) distilling out the alcohol from the reaction mixture, cooling the reaction mixture and obtaining the said hydrolyzed silane solution thereof and (b) involving said hydrolyzed amino silane solution having hydrolyzed amino silane oligomer free of alkoxy groups in its alpha omega position in an amount of 0.5 to 4% by wt. of the reaction mixture to control the amine number to upto 0.12 mg of KOH per gram of the polymer for producing said amino silicone polymeric fluid therefrom, which is free of any crosslinked silicone polymers or any other type of amino silane or siloxane and involving essentially linear propagation of the difunctional unit of the siloxane molecule;
ii. adding said amino silicone polymeric fluid thereof in an amount 20 to 60% by wt together with said non-ionic emulsifiers having HLB in the range of 10-14 comprising mixture of non-ionic emulsifiers in an amount 2 to 20% by wt and water in an amount 35 to 75% by wt and optionally an cationic emulsifier/s in an amount from zero to 7% by wt.;
iii. homogenizing the mix by combination of stirrer and/or homogenizer at a temperature range of 10 to 40° C. and obtaining the said emulsion therefrom.

2. A process as claimed in claim 1 wherein the emulsion obtained comprise of more than one emulsifier and has a HLB value between 8-14 which facilitates the synthesis of said stable emulsion.

3. A process as claimed in claim 1, further comprising adding organic acid to adjust the final emulsion pH toward acidic pH.

4. A process as claimed in claim 1 wherein a temperature in the range of 10 to 40° C. is maintained while making emulsion and maintaining a temperature below 20° C. to generate particle size of under 1000 nm in the emulsion and higher temperature around 40° C. is maintained for generating emulsion having particle size more than 1000 nm.

5. A process for the synthesis of a amino silicone emulsion as claimed in claim 1 with particle size below 1000 nm, comprising the steps of:
   i. adding emulsifiers in the emulsion tank by taking water in the emulsion tank;
   ii. mixing of the water and emulsifiers for few minutes followed by addition of the amino fluid and homogenizing the mix until it becomes a thick paste;
   iii. adding the rest of the water in a controlled manner followed by homogenizing the mix after each addition of water;
   iv. adding biocide at the level of 15 ppm for preserving the emulsion against microbial contamination and obtaining the said emulsion.

6. A process for the manufacture of a amino silicone emulsion as claimed in claim 1 with particle size above 1000 nm, comprising the steps of:
   i. adding total water and emulsifiers in the tank wherein depending on the type of emulsifiers, temperature of the mixture was increased so that emulsifiers dissolve in water;
   ii. cooling the emulsifier/s solution below 40° C.;
   iii. adding said amino fluid in the emulsion tank and stirred until particle size above 1,000 nm is achieved in the emulsion by involving viscojet stirrer to achieve high particle emulsion and narrow distribution of particle size;
   iv. adding the biocide at the level of 15 ppm for preserving emulsion against microbial contamination and obtaining the said emulsion.

7. A process for the synthesis of amino silicone polymeric fluid comprising of viscosity of at least 50000 cps to upto 2 Mio cps at 25° C. with an amine number of up to 0.12 mg of KOH per gm of the polymer and obtained of hydrolyzed amino silane solution having hydrolyzed amino silane oligomer free of alkoxy group in its alpha omega position and free of any crosslinked silicone polymers or any other type of amino silane or siloxane and involving essentially linear propagation of the difunctional unit of the siloxane molecule comprising the steps of
   i. reacting the said hydrolyzed amino silane solution with the linear oligomer of organopolysiloxane or organocyclosiloxane or mixture thereof together with a polymer chain stopper in presence of alkaline catalyst at 70-150° C. under $N_2$ atmosphere;
   ii. neutralizing the polymer after completion of the reaction with acidic organic compound compatible with the said amino silicone polymer;
   iii. removing volatiles in the amino silicone polymer by vacuum stripping at 110 to 220° C. and obtaining the said amino silicone polymer thereof that was then cooled to room temperature under vacuum after completion of stripping; and
   wherein the quantity of said hydrolyzed amino silane solution having hydrolyzed amino silane oligomer free of alkoxy groups in its alpha omega position added in the reaction mixture is 0.5 to 4% by wt. for the generation of the final aminosilicone polymeric fluid with amine number controlled to upto 0.12 mg of KOH per gram of the polymer.

8. A process as claimed in claim 7 wherein the linear oligomer of organopolysiloxane used is of the general formula, $OH(R^1R^1SiO)_nH^1$ is the monofunctional, saturated or unsaturated alkyl group with 1 to 20 carbon atoms or monofunctional aryl group with 6 to 20 carbon atoms;
   wherein n is the integer vary from 5 to 500;
   wherein Organocyclosiloxane is of the general formula, $(R^1R^1SiO)_m$
   wherein $R^1$ is the monofunctional, saturated or unsaturated alkyl group with 1 to 20 carbon atoms or monofunctional aryl group with 6 to 20 carbon atoms, most preferably methyl group;
   wherein m is the integer vary from 4 to 10.

9. A process as claimed in claim 7 wherein the polymer chain stopper is a short chain organic polymer having an organic group at α, ω position.

10. A process as claimed in claim 7 wherein the alkaline catalyst is alkaline metal hydroxide or alkoxide or quaternary salts or suitable polymerization catalyst.

11. A process for the preparation of the hydrolyzed amino silane solution for application in viscous conditioning formulations comprising hydrolyzed amino silane oligomer free of alkoxy group in its alpha omega position obtained of only the amino silane of general formula $$(R^1)_a(R^1O)_bSi(-R^2-NR^3-R^2-NR^3)_{4-a-b} \qquad (I)$$

wherein 'b' is the integer of maximum 2 and 'a' maximum 2 and when 'b' is the integer of maximum 2, a=1 and when 'a' is the integer of maximum 2, b=1;
   wherein $R^1$ is a monofunctional, saturated or unsaturated alkyl group with 1 to 20 carbon atoms or monofunctional aryl group with 6 to 20 carbon atoms;
   wherein $R^2$ is the difunctional alkylene group with 1 to 10 carbon atoms or difunctional aryl group with 6 to 10 carbon atoms;
   wherein $R^3$ is the hydrogen atom or atoms or saturated or unsaturated alkyl group with 1 to 20 carbon atoms or monofunctional aryl group with 6 to 20 carbon atoms;
comprises the steps of:
   i. Dissolving the silane in an organic solvent in the concentration range of upto 20%;
   ii. adding water in a stoichiometric amount half mole in respect of 'b' in the said silane of general Formula I and in controlled amount in nitrogen atmosphere in a temperature range of 50-130° C. to split the alkoxy group completely from silane molecule;
   iii. distilling out the alcohol from the reaction mixture, cooling the reaction mixture and obtaining the said hydrolyzed silane solution thereof.

12. A process as claimed in claim 1 wherein the organic acids include formic acid, acetic acid, propionic acid, isopropionic acid, butyric acid, isobutyric acid, tert-butyric acid, entanoic acid and isomers, hexanoic acid and isomers, heptanoic acid and isomers, octanoic acid and isomers, citric acid and isomer, lactic acid or isomers or similar type of organic acid.

13. A process as claimed in claim 1 wherein the organic acid is acetic acid.

14. A process as claimed in claim 7 wherein in the linear oligomer of organopolysiloxane $R^1$ group is preferably methyl group; n preferably varys from 10 to 60; m values preferably varys from 4 to 5.

15. A process as claimed in claim 7 wherein the polymer chain stopper is hexamethyldisiloxane or short chain polydimethyl siloxane having trimethyl siloxy groups attached at α, ω position.

16. A process as claimed in claim 7 wherein said alkaline catalyst is selected from potassium or caesium methoxide or ethoxide for making high viscous amino emulsion.

17. A process as claimed in claim 7 wherein the amine number of aminosilicone polymeric fluid is within 0.06 mg of KOH per gm of the polymer.

18. A process as claimed in claim 11 wherein said organic solvent is selected from aromatic solvents including toluene, xylene or aliphatic solvent including octane or cyclosiloxane including octamethyl cyclosiloxane, decamethylcyclopentasiloxane or any other higher cyclosiloxane or mixture thereof or low viscous silicone oil.

19. A process as claimed in claim 11 wherein preferable solvents being cyclosiloxane and particularly octamethylcyclotetrasiloxane.

20. A process as claimed in claim 11 wherein temperature range of 60 to 100° C. is preferably employed to split the alkoxy group completely from silane molecule.

21. A process for the synthesis of a stable high viscous amino silicone emulsion according to claim 1, wherein said step (a) of hydrolyzing aminosilane comprises:
  i. Dissolving the silane in an organic solvent in the concentration range of upto 20%;
  ii. adding water in a stoichiometric amount half mole in respect of 'b' in the said silane of general Formula I and in controlled amount in nitrogen atmosphere in a temperature range of 50-130° C. to split the alkoxy group completely from silane molecule; and
  iii. distilling out the alcohol from the reaction mixture, cooling the reaction mixture and obtaining the said hydrolyzed silane solution thereof.

22. A process as claimed in claim 1 wherein adding 25 to 50% by wt amino silicone polymeric fluid together with non-ionic emulsifiers having HLB in the range of 10-14 comprises mixture of non-ionic emulsifiers in an amount 5 to 20% by wt and water in an amount 26 to 70% by wt and/or an cationic emulsifier/s in an amount from 0 to 4% by wt.

23. A process as claimed in claim 7 wherein said vacuum stripping is performed in the temperature range of 150-180° C.

* * * * *